(12) United States Patent
Roberts et al.

(10) Patent No.: US 11,812,691 B2
(45) Date of Patent: Nov. 14, 2023

(54) LAWNMOWER

(71) Applicant: Robert Bosch GmbH, Stuttgart (DE)

(72) Inventors: Ana-Maria Roberts, Bury St Edmunds (GB); William Johnson, Ipswich (GB)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 17/132,569

(22) Filed: Dec. 23, 2020

(65) Prior Publication Data

US 2022/0192090 A1    Jun. 23, 2022

(51) Int. Cl.
| | | |
|---|---|---|
| *A01D 34/74* | (2006.01) | |
| *A01D 34/64* | (2006.01) | |
| *A01D 34/78* | (2006.01) | |
| *A01D 34/00* | (2006.01) | |
| *A01D 101/00* | (2006.01) | |

(52) U.S. Cl.
CPC ........... *A01D 34/74* (2013.01); *A01D 34/008* (2013.01); *A01D 34/64* (2013.01); *A01D 34/78* (2013.01); *A01D 2101/00* (2013.01)

(58) Field of Classification Search
CPC ...... A01D 34/74; A01D 34/008; A01D 34/64; A01D 34/78; A01D 2101/00
USPC ........................................................ 56/17.1
See application file for complete search history.

(56) References Cited

U.S. PATENT DOCUMENTS

| | | | |
|---|---|---|---|
| 2012/0023880 A1 | 2/2012 | Messina et al. | |
| 2012/0023887 A1* | 2/2012 | Messina | B60L 15/20 |
| | | | 56/320.1 |

FOREIGN PATENT DOCUMENTS

| | | |
|---|---|---|
| DE | 20 2013 006 712 U1 | 8/2013 |
| EP | 2 412 219 A1 | 2/2012 |
| EP | 2 425 701 A2 | 3/2012 |
| EP | 3 167 703 A1 | 5/2017 |
| WO | 2014/007696 A1 | 1/2014 |

* cited by examiner

*Primary Examiner* — Mahmoud Gimie
(74) *Attorney, Agent, or Firm* — Maginot, Moore & Beck LLP

(57) ABSTRACT

The disclosure proceeds from an autonomous lawnmower having a chassis, a motor for driving a cutting device, and a height adjustment device for a displacement of the cutting device and of the motor relative to the chassis, at least for setting a working height of the cutting device relative to the chassis, in particular for setting a cutting height of a cutting tool of the cutting device, wherein the height adjustment device has a hollow cylindrical rotary body and a sliding seat surrounding the rotary body, which rotary body and sliding seat have corresponding threads such that a rotation of the rotary body results in a linear displacement of the sliding seat.
One of the threads has at least two thread sections, wherein the one thread section is elastically displaceable radially in relation to the thread axis.

14 Claims, 12 Drawing Sheets

C-C

D - D

Fig. 11
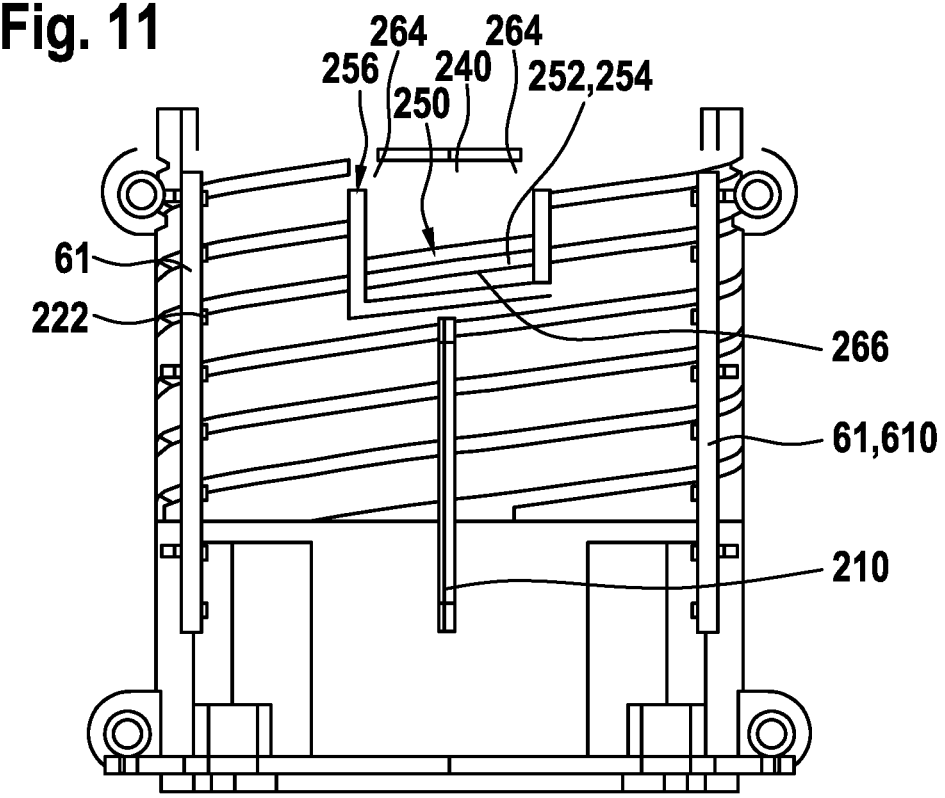
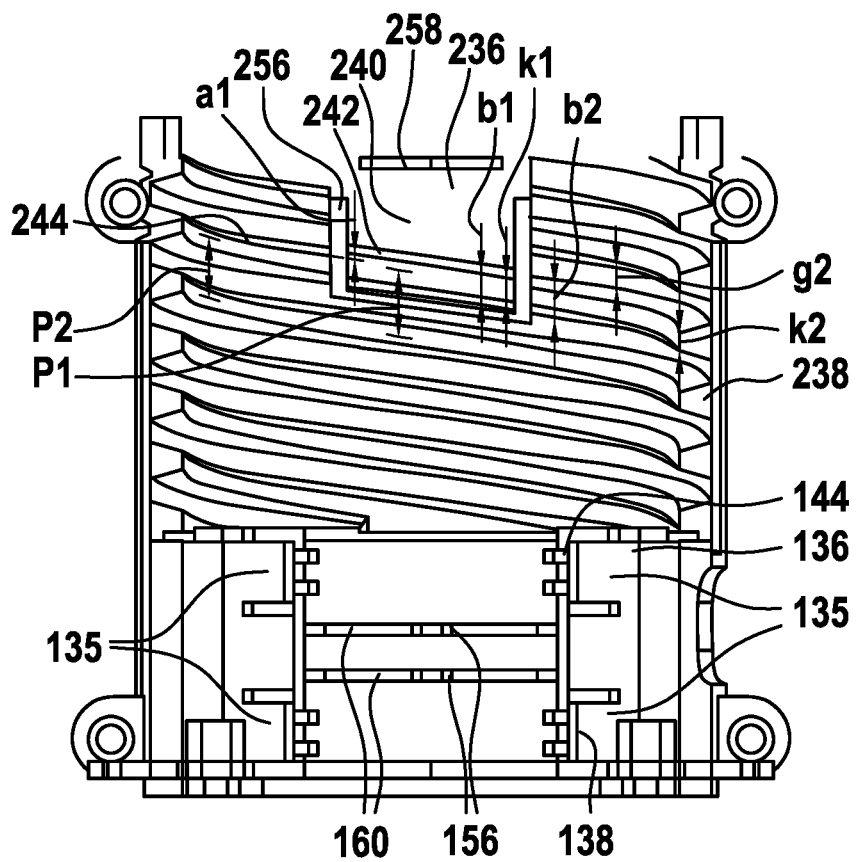

LAWNMOWER

BACKGROUND

Lawnmowers, in particular autonomous lawnmowers having at least a chassis a motor for driving a cutting device and a height adjustment device for a displacement of the cutting device and of the motor relative to the chassis, at least for setting a working height (h) of the cutting device relative to the chassis, in particular for setting a cutting height (s) of a cutting tool of the cutting device, are already known.

SUMMARY

The disclosure proceeds from a lawnmower, in particular autonomous lawnmower, having at least a chassis, a motor for driving a cutting device, and a height adjustment device for a displacement of the cutting device and of the motor relative to the chassis, at least for setting a working height of the cutting device relative to the chassis, in particular for setting a cutting height of a cutting tool of the cutting device, wherein the height adjustment device has an in particular hollow cylindrical rotary body and a sliding seat in particular surrounding the rotary body, which rotary body and sliding seat have corresponding threads such that a rotation of the rotary body results in a linear displacement of the sliding seat.

It is proposed that at least one of the threads has at least two thread sections, wherein the one thread section, in particular an elastically displaceable thread section, preferably a thread section which is elastically displaceable radially in relation to the thread axis, comprises means which, in relation to the further thread section, increase a thread tooth width of the one thread section and/or reduce a thread turn width of the one thread section and/or cause an offset of a flank and/or an offset of a lead of the one thread section.

A "lawnmower" is to be understood to mean a working appliance for performing work, in particular work in a garden. A lawnmower may also be understood to mean some other appliance which is suitable for shortening or trimming a lawn, for example a scarifier or the like. A lawnmower may for example be in the form of a push-type lawnmower with or without a propulsion drive or in the form of an autonomous lawnmower. For this purpose, the lawnmower typically has wheels which support the chassis on the underlying surface and allow movement of the lawnmower in particular with low resistance over a working surface.

Here, an "autonomous lawnmower" is to be understood in particular to mean an appliance which propels itself, orients itself and/or navigates automatically in an area and/or in an environment, in particular after a learning process. The expression "automatically propel itself and/or orient itself" is to be understood here in particular to mean that the appliance propels itself, orients itself and/or navigates, in particular after a learning process, without human intervention. Preferably, the autonomous lawnmower is provided for traveling and/or performing work on a working surface, in the form of a lawn area, and/or on a working environment in the form of a garden environment.

A "chassis" is to be understood in particular to mean a running gear with wheels received thereon. Said wheels may be provided merely for rolling and/or may be partially or fully driven. The chassis may however also constitute the suspension and/or a frame for other propulsion or support means which are received thereon, for example articulated arms for a manner of propulsion based on walking, one or more rotors for a flying manner of propulsion, or the like. The chassis may serve as a frame for the suspension and/or fixing of the propulsion means and/or of further components of the working appliance, for example for a power supply, an open-loop or closed-loop control means, a body, for working and propulsion drives, and/or the like. On the chassis wheels, there are received in particular driven wheels for supporting the chassis on the underlying surface. The chassis of the lawnmower is designed for receiving the height adjustment device, the motor and the motor-receiving housing. At least a part of the height adjustment device is fixedly connected to the chassis.

A "height adjustment device" may also be understood to mean a height adjustment unit. It is provided for setting a working height of the lawnmower. It is preferably provided for setting a working height, in particular a cutting height, of the cutting device or of a tool, which is received by a tool receptacle, relative to an underlying surface. Here, setting may be performed manually by an operator, automatically, or by manual initiation and mechanical implementation, for example by means of a height adjustment motor. Preferably, the height adjustment device is provided for tool-free setting of a working height, in particular of a cutting height, of a tool, which is received by the tool receptacle, relative to an underlying surface and/or relative to the chassis. The height adjustment device is configured for displacing the cutting device together with the motor-receiving housing relative to the chassis. Here, the working height is preferably defined by a plane which runs parallel to an underlying surface and/or to a standing plane of the autonomous working appliance and in which a lowest point of a tool lies. The expression "provided" is to be understood in particular to mean specially configured and/or equipped. The statement that an object is provided for a particular function is to be understood in particular to mean that the object performs and/or carries out said particular function in at least one state of use and/or operating state. By means of the height adjustment unit, it is advantageously possible for the drive unit and/or the motor-receiving housing, which receives the drive unit, to be adjusted in terms of height. In particular, on the motor-receiving housing, there may also be a catching guard, in particular for catching parts of the cutting device which become detached.

A "sliding seat" or a "support unit" is preferably to be understood to mean a unit which is provided for supporting forces, in particular for supporting forces of the drive unit and/or of the tool receptacle and/or of the tool and/or of the motor housing which receives the drive unit. These are to be understood in particular to mean bearing and/or holding forces for example owing to the weight force and/or operating forces of the drive unit and/or tool receptacle and/or of the tool. During normal operation, these may for example be acceleration and braking forces of the drive unit, but in particular oscillations or vibrations and/or the like in particular of the drive unit and/or of the tool receptacle and/or of the tool. They may be forces which are caused for example by an imbalance of the tool receptacle, in particular of a tool receptacle in the form of a rotary disk and/or by the one or more tools fixed to the tool receptacle, and/or the like. An imbalance may be caused for example by manufacturing tolerances of the tools, may sometimes arise in particular at the tool receptacle owing to one tool in particular of a multiplicity of tools, preferably of a multiplicity of tools provided on the tool receptacle, having become relatively heavily worn and/or having fallen off, and/or the like. Furthermore, pressure forces, shock forces and/or impact forces which act in particular on the tool receptacle and/or on the tool can be supported by the support unit, for example during the cutting or commencement of cutting of a hard object. It is also possible for other forces, which act axially, radially and/or in a circumferential direction at least indirectly on the tool receptacle, to be supported by the support unit. The support unit preferably supports said forces at least indirectly on the chassis. The support unit is preferably designed to be height-adjustable. It is preferably guided linearly in axially displaceable fashion.

A "guide device" may be provided at least for rotationally inhibiting the support unit or the sliding seat, in particular for rotationally inhibiting the motor-receiving housing, which is connected to the support unit, and/or motor housing of the motor. Said guide device comprises in particular at least one guide element. The guide device may be designed for preventing play between the support unit and the guide device. The guide device or a guide element may for example guide a sliding seat of the height adjustment unit, in particular a sliding seat formed by the support unit, in particular impart such guidance at least with rotation-inhibiting action. The guide device or a guide element advantageously has guide means which are/is of circumferentially elastic form, in particular with circumferentially elastic rotation-inhibiting action. Said guide means are provided for rotation-inhibiting and axial guidance about or in a height adjustment axis direction at least of the motor housing, in particular of the motor-receiving housing, preferably of the sliding seat or of the support unit, relative to the chassis. Said guide means are advantageously designed to be elastically displaceable in a circumferential direction about the height adjustment axis.

It is advantageously possible for tolerance deviations, in particular in the production of the chassis and/or of the sliding seat, to be selected to be relatively coarse. Noise emissions of the lawnmower can be improved. A transmission of vibrations from the cutting device and/or motor to the chassis is reduced. The loading for the cutting device, the drive, the height adjustment device and/or the chassis can be reduced.

It is proposed that at least one of the threads has at least one thread turn with at least two thread turn sections, wherein one thread turn section, in particular an elastically displaceable thread turn section, has a different gradient and/or a different flank width than the further thread turn section, and/or that at least one of the threads has at least two thread sections which adjoin one another in a circumferential direction in relation to the helical line of the thread, wherein a thread flank, in particular a thread flank surface, preferably a thread tooth flank of one relative to the further thread section has an axial offset in relation to the helical line of the thread and/or has an offset normal with respect to the helical line, and/or that a thread tooth width (and/or flank width) of one thread section is greater, and/or a thread turn width (or thread tooth space) of one thread section, is smaller than that of the further thread section.

It is proposed that the one or more means is at least one thread flank with a different lead and/or with a different flank width, and/or that the means is a flank or surface, in particular thread flank, preferably a thread tooth flank, which, relative to the further thread section, has an axial and/or normal offset in relation to the helical line thereof, and/or that the means is a greater thread tooth width and/or flank width and/or tooth tip width and/or a smaller thread turn width of the one thread section in relation to the thread tooth width or flank width or thread turn width of the further thread section.

In this way, an axial play of the threads relative to one another, in particular at at least one flank, can be at least reduced, in particular partially eliminated. Nevertheless, at least reduced-play relative rotation of the threads remains possible. It is advantageously possible for noise generation or rattling of the threads relative to one another, in particular on uneven terrain and/or in the case of an imbalanced cutting device, to be avoided. The statement that the one thread section has a different lead and/or different thread tooth width (or flank width) or thread turn width (or thread tooth space) is not to be understood as meaning any deviations resulting from tolerances and/or wear. Rather, these are selected or predefined by design in some other way. The flank width differs at identical flank diameters. Preferably, the entirety of one thread turn section has a different lead and/or a different flank width than the further thread turn section. However, the one thread turn section could also at least partially have a different lead and/or a different flank width than the further thread turn section. The thread sections extend in a circumferential direction about the thread axis. The one thread section is advantageously adjacent to, or surrounded by, further thread sections in opposite circumferential directions. In this way, a play between the threads of the rotary body and sliding seat is eliminated. Radial and/or axial relative movements of the two bodies with respect to one another require at least an elastic displacement of the thread section. In this way, a generation of noise as a result of vibrations of the cutting device and/or of the motor and/or of the lawnmower can be prevented. A damping action is attained. Forces, in particular radial and/or axial forces, between rotary body and sliding seat can be cushioned.

The thread and/or the elastically displaceable thread section are of self-locking design, in particular in the form of a self-locking trapezoidal thread or of a trapezoidal thread section. In this way, an unintended height adjustment of the height adjustment device can be avoided.

It is proposed that the one or more means is a thread tooth with tooth flanks which are displaceable relative to one another, in particular with tooth flanks which are elastically displaceable relative to one another, preferably with tooth flanks which are displaceable relative to one another axially with respect to the thread axis or normally with respect to the helical line.

It is proposed that the one or more means is at least one surface, in particular one sliding surface, in particular one surface with the same action as a tooth flank, which narrows a thread turn width and/or causes the offset.

The thread sections are in particular thread sections which are adjacent along a helical line of the thread and/or along the circumferential direction of the thread. Between the thread sections, there is advantageously provided a groove, preferably in each case one axial groove for thread sections, which are adjacent in opposite circumferential directions, of the one thread section, in particular in order to allow a preferably elastic displacement of the one thread section in a radial direction with respect to the thread axis. The expression of "adjacent in a circumferential direction" is to be understood in particular as meaning adjacent in the circumferential direction of the same thread turn, preferably adjacent within one revolution of the thread turn. A helical line is to be understood in particular to mean the lead line or main lead line or tooth flank line at a constant flank diameter of the thread.

The tooth flank surface of the one thread section may advantageously be designed to be axially and/or normally offset with respect to the tooth flank surface of the tooth flank surface(s), which are/is adjacent along the helical line and/or in the circumferential direction, of the further thread section.

In this context, a lead (single-turn thread) is also to be understood to mean a pitch (multi-turn thread). The lead and/or pitch may be increased and/or in particular decreased to the axially adjacent tooth.

The thread may be a single-turn or preferably multi-turn thread. A thread section is to be understood in particular to mean a thread turn section or thread tooth section of a single-turn or preferably multi-turn thread. It is advantageously the case that only one tooth flank or thread turn flank of the one thread section is designed to be axially shifted in relation to the tooth flank or thread turn flank of a thread section, which is adjoining in the circumferential direction, of the thread. The thread flank of the one thread section is advantageously shifted in relation to the axially adjacent flank of the thread turn. The threads of the rotary body and sliding seat have, at further thread sections, a play between the threads, in particular an axially unilateral flank play. A play on the axially opposite flank is preferably taken away by the means or the displacement of the threads with respect to one another caused by the means.

The thread may be an internal or external thread, and is preferably an internal thread of the sliding seat. The expression "adjoining" may also be understood to mean adjacent, in particular immediately adjacent, in the circumferential direction. The flank width may also be understood to mean a thread tooth width and/or thread tooth space width. A flank line and/or tip line and/or flank width thus has an inhomogeneity, in particular an offset or the like. This advantageously impedes at least a free movement of the thread. It, as it were, takes away a play between internal and external thread at least in the region of the one thread section at both flanks, and in particular takes away a play at at least one flank of the thread as a whole, in particular in an axial direction along the thread axis. The thread is advantageously displaced such that at least one flank of the external and internal thread lie against one another without play. Advantageously, the thread is displaced such that at least one thread flank of the adjoining or of the further thread sections of the thread and two thread flanks of the one thread section lie against one another without play.

It is proposed that at least one of the threads has an elastically displaceable thread section, in particular a thread section which is elastically displaceable radially with respect to the thread axis, wherein the thread section is, by way of a section which extends in a circumferential direction with respect to the thread axis, attached to the one thread or to the rotary body or to the sliding seat.

In other words, at least one of the threads could have three thread sections which are adjacent in a circumferential direction, wherein the middle thread section, which is in particular designed to be radially elastic in relation to the thread axis, is separated by two axial grooves from the thread sections which are adjacent in the circumferential direction, and in particular is designed to be separated from an axially adjacent thread section by a circumferential groove or helical line section groove. The circumferential groove or helical line section groove is preferably arranged between a tooth flank of the middle thread section and an axially adjacent tooth flank of the thread.

It is proposed that the section is formed as a circumferential web and/or torsion beam.

The elastically displaceable thread section and/or the lug is arranged in the region of a distally arranged end of the sliding seat relative to the motor-receiving region and/or to the receiving and/or attachment region of the motor-receiving housing, in particular in the region of an axially distal third of the thread of the sliding seat. The distal end of the sliding seat is to be understood in particular to mean a free end of the sliding seat. In this way, the elastically displaceable thread section can remain in engagement with the rotary body over the intended height adjustment distance.

It can thus be achieved that the elastic displaceable thread section is in engagement with the thread of the rotary body over the entire height adjustment travel. Owing to the fact that the elastically displaceable thread section is arranged on the sliding seat, there is no need for multiple elastically displaceable thread sections on the rotary body.

It is proposed that the one thread section is received on a radially elastically displaceable lug, in particular on a lug which is attached to the section or circumferential web and/or torsion beam, in particular received on a free end of the lug, preferably received spaced apart from the section, in particular received spaced apart from the section by at least one lead height.

The lug is, at one side normally with respect to the thread axis, fixed to the one thread or to the rotary body or sliding seat. The thread section is arranged closer to a free end of the lug than to the attachment point of the lug to the thread and/or of the sliding seat. The lug is attached at one of four sides, in particular so as to be pivotable about the attachment region. At the three further sides, the lug is separated from, or formed so as to have a clearance with respect to, the rest of the thread and/or the sliding seat, in particular by means of a groove.

It is proposed that the section and/or the lug are/is fixed to a distal end of the thread, in particular of the rotary body or sliding seat, and in particular, the one thread section is arranged in the region of a distal end of the thread.

The thread section is elastically displaceable relative to the thread, surrounding said thread section, of the sliding seat, in particular relative to thread section, which is adjacent axially and/or in a circumferential direction, of the thread of the sliding seat or rotary body. The rotation of the rotary body causes a linear displacement of the sliding seat relative to the rotary body.

It is proposed that, on the sliding seat or rotary body, there are provided multiple elastically displaceable thread sections, preferably two, in particular spaced apart equiangularly about the axis of rotation, wherein, in particular, the elastically displaceable thread sections come to lie in a plane normal to the axis of rotation or thread axis, wherein, in particular, the elastically displaceable thread sections are arranged on different thread turns of the thread which is formed as a multi-turn thread. Owing to the fact that the elastically displaceable thread sections spaced apart equiangularly about the axis of rotation and/or come to lie in a common plane, a misalignment is avoided. Centering of the rotary body and/or sliding seat, in particular of the rotary body and/or sliding seat, with respect to one another can be achieved. A free movement of the height adjustment device is maintained. In particular, two, preferably adjacent, thread sections, which are in particular adjacent relative to the axis of rotation and elastically displaceable, are provided. They come to lie in a common plane normal to the axis of rotation.

It is proposed that the one thread section is formed as a single piece with the rotary body or sliding seat and/or the lug and/or the further thread section.

It is proposed that one of the threads is an internal thread or external thread and/or is a multi-turn, in particular a four-turn thread, in particular that an equal number or half as many elastically displaceable thread sections as thread turns are provided. In this way, the elastically displaceable thread sections can be arranged in a plane normal to the axis of rotation in an effective manner. Centering of the rotary body and/or sliding seat, in particular of the rotary body and/or sliding seat, with respect to one another can be achieved.

It is proposed that the elastically displaceable thread section is displaceable axially and/or radially in relation to the axis of rotation of the sliding seat relative to the thread section, which is adjacent in an axial and/or a circumferential direction, of the thread which is otherwise not elastically displaceable.

It is proposed that a motor-receiving housing, which receives the motor in particular with sealing action, is connected to the sliding seat such that the motor-receiving housing is received within the in particular cylindrical rotary body, in particular within an inner cylindrical lateral surface of the rotary body, in particular so as to be linearly displaceable together with the sliding seat relative to the rotary body or relative to the chassis.

A play between rotary body and sliding seat can advantageously be avoided or substantially eliminated. The elastically displaceable thread section can be provided for damping, in particular for vibration damping. Vibrations of the cutting unit and/or of the motor, in particular in the transmission path to the chassis and/or the housing, can thus advantageously be dampened. The noise emissions of the lawnmower can be reduced. Generation of noise, in particular rattling noises or the like, can be avoided. In particular, a radial or axial play between the components is prevented. A rotation-inhibiting action can be attained. The rotation-inhibiting action can however be overcome when an actuation is intended, such that a force that has to be imparted to perform the height adjustment remains relatively low. An inexpensive material for vibration prevention or noise prevention is proposed, in particular because no additional components are required. It is proposed that the elastically displaceable thread section, in the state in which it is not connected to the rotary body, has substantially the same core diameter as the thread.

It is proposed that the motor and/or the motor-receiving housing are/is arranged displaceably within the rotary body. It is furthermore proposed that the sliding seat is connected at least indirectly to the motor or motor-receiving housing so as to be jointly displaceable therewith. It is proposed that the sliding seat is designed to be inhibited in terms of rotation, in particular inhibited in terms of rotation about a height adjustment axis. For this purpose, it is for example possible for axial guide devices to be provided. The rotary seat may be designed to be inhibited in terms of rotation by means of positive-locking elements. For example, corresponding positive-locking elements, in particular linear guide devices, may be provided on the sliding seat and on guide elements. The guide devices are advantageously fixedly connected to the chassis. It is proposed that the motor and/or the motor-receiving housing are received, so as to be inhibited in terms of rotation in the circumferential direction, by the sliding seat. The cutting device, the motor, the motor-receiving housing and the sliding seat are formed to be jointly axially displaceable. It is proposed that the sliding seat functions as support device for the drive unit or the motor and/or the motor-receiving housing which receives the motor. It is proposed that an axis of rotation of the rotary body corresponds to the central axis of the sliding seat and/or to the height adjustment axis. The sliding seat is provided for being axially displaced along said axis/axes.

The rotary body at least partially radially surrounds the motor and/or the motor-receiving housing. The sliding seat is connected at least indirectly to the motor or motor-receiving housing. These are designed to be jointly displaceable. They are designed to be inhibited in terms of rotation.

It is proposed that the one thread section of the sliding seat has a thread tooth width which at least substantially corresponds to the thread tooth space of the rotary body. It is advantageously thus possible for the play to at least partially be eliminated in one thread section. Owing to the elastic displaceability, the thread section can however be displaced or forced radially outwards, in particular in order to allow a relative rotation of rotary body and sliding seat with respect to one another. Even in the event of wear of the threads on sliding seat or rotary body, the elastically displaceable thread section may occasionally utilize this wear. The elastically displaceable thread section could also be designed to be preloaded radially inwards.

The elastically displaceable thread section is at least partially designed for self-locking of the rotary body relative to the sliding seat. This may be achieved by means of a radial preload of the thread section with respect to the axis of rotation and/or by virtue of the thread section having a thread tooth width which is greater, and/or a thread tooth space which is smaller, than the thread tooth width or thread tooth space of the thread, in particular of the thread of the sliding seat.

Furthermore, a lawnmower is proposed, the sliding seat of which is received in linearly displaceable fashion on the outer lateral surface of the rotary body, and a motor-receiving housing which in particular sealingly receives the motor is connected to the sliding seat such that the motor-receiving housing is received within the cylindrical rotary body, in particular within an inner cylindrical lateral surface of the rotary body, in particular so as to be linearly displaceable together with the sliding seat. It is proposed that the rotary body has an external thread and the sliding seat has an internal thread, in particular in order to be displaceably received linearly displaceably on the outer lateral surface of the rotary body. It is advantageously thus possible to attain a very compact design of the height adjustment device and/or of the motor-receiving housing and/or of the lawnmower. A design which seals off the motor is made possible. A vibration-damping design is made possible. A sealed motor-receiving housing is to be understood in particular to mean that permeability to air is made possible—in particular for the purposes of pressure equalization, but moisture is prevented from ingressing into the motor-receiving housing, in particular liquids.

A lawnmower is proposed, in particular autonomous lawnmower, having at least a chassis, a motor received by a motor-receiving housing, and a cutting device which can be driven by the motor, furthermore having a height adjustment device for a displacement of the cutting device, of the motor-receiving housing and of the motor relative to the chassis, at least for setting a working height of the cutting device, in particular for setting a cutting height of a cutting tool of the cutting device relative to the chassis, wherein the motor-receiving housing has a cover and at least one main body, in particular a main body in the form of a pot-shaped housing.

It is proposed that the cover is provided for fixing the motor. The cover fixes the motor on the motor-receiving housing. In this way, accessibility to the motor for maintenance purposes can be improved. The component that receives the motor—in this case the cover—typically has a relatively small volume, in particular it encloses a relatively small volume. The production of a cover can thus be less expensive, and/or the amount of material required for the cover can be less, in particular than for a main body which receives the motor. Furthermore, characteristics with regard to heat transport through the cover and/or prevention of heat transport through the main body can be easily provided. The cover can be optimized in terms of strength for the receiving and/or fixing and/or thermal attachment of the motor.

It is proposed that the cover is arranged between the cutting device and the motor housing of the motor. The cover is provided for receiving and/or fixing a drive shaft side of a motor housing of the motor. The cover forms, as it were, the motor flange for receiving and/or fixing the motor. The motor has a motor housing. The motor housing encloses a stator and rotor of the motor. The motor housing has bearings for supporting a drive shaft. The drive shaft is provided for driving, in particular for directly driving, the cutting device. The drive shaft projects through an aperture in the cover or in the motor flange. The drive shaft drives a tool receptacle or a tool arranged on the tool receptacle. Tool receptacle and tool may form at least parts of the cutting device. The cutting device may for example be formed as a cutter bar, as a rotary disk with at least one blade, as a rotary disk with at least one blade which is rotatable relative to the rotary disk, and/or the like.

The main body encloses the motor radially in relation to the axis of rotation thereof. The main body encloses the motor axially, in relation to the axis of rotation thereof, on one side, in particular averted from the drive shaft side. The main body encloses the motor axially, in relation to the axis of rotation thereof, on the side situated opposite the cover. The main body is designed to be spaced apart from the motor housing. An inner contour of the main body is designed to be spaced apart from the outer contour of the motor, in particular so as to be spaced apart from the motor housing of the motor.

The cover closes the main body, in particular the main body in the form of a pot-shaped housing. A seal is advantageously arranged between cover and main body. The seal may in particular be formed as a static seal, for example by a sealing ring or the like. Aside from a wall which axially closes off the motor and which in particular closes the motor-receiving housing, the cover may also have radial walls. The axial extent thereof is however at least less than the axial extent of the radial wall of the main body, in particular of the housing pot. The radial wall may have a substantially cylindrical, square, rectangular shape and/or a mixture of these and/or any other contour which radially surrounds the motor, for example a free-form contour. The radial wall may also be constructed from multiple wall sections. The radial and axial wall of the main body is advantageously formed as a single piece. The main body advantageously has plastic. In particular, the main body is formed from plastic. In particular, the main body is formed from material which is insulating from a thermal conductivity aspect. The main body may also have an axial wall which is designed to be detachable from the radial wall. Said radial and axial walls are advantageously cohesively connected.

It is proposed that the cover and the main body are formed from materials with different thermal conductivity, wherein, in particular, the cover is formed from a material with increased thermal conductivity, preferably with a thermal conductivity which is several times higher than the thermal conductivity of the main body, wherein, in particular, the main body is formed from a thermally insulating material, in particular thermally insulating plastic.

It is proposed that the cover is provided for dissipating heat in the direction of a standing plane of the lawnmower and/or in the direction of the region of the cutting device, in particular in the direction of an air flow caused by the cutting device, in particular in the direction of an air flow caused by a tool and/or a tool receptacle of the cutting device.

The cover may for example be constructed from a plastic with increased thermal conductivity, a composite material, a metal, in particular at least aluminum-containing metal or the like. The thermal conductivity of the cover or motor flange is preferably in the range of that of aluminum alloys. A heat flow in the motor-receiving housing can thus be diverted. A part of the motor-receiving housing, in particular the cover or motor flange, can thus serve at least as a part of a cooling system. The cover dissipates heat in the direction of the standing plane or in the direction of the tool receptacle, in particular in the direction of an air flow caused by the tool or the tool receptacle. The cover is advantageously in direct contact with air or with an air flow at an underside of the working appliance. The air flow is advantageously caused by the working appliance, in particular a tool receptacle and/or the tool. The main body or the pot-shaped housing is advantageously formed from a material which is at least insulating from a thermal conductivity aspect, for example plastic, in particular a thermally insulating material and/or plastic. By virtue of the fact that the motor-receiving housing or the main body and cover have/has different materials, it is possible on the one hand to provide an insulation action in particular in the region surrounding the main body, and on the other hand to provide heat conduction, in particular through the cover into the surroundings. The cover or motor flange, which is in particular in contact with the air flow caused by the tool receptacle and/or the tool, dissipates heat. The main body or the rest of the motor-receiving housing or the housing pot, which is typically arranged in the interior of the housing of the working appliance, is at least insulating and/or at least has an insulating action. It is advantageous for only the cover or motor flange to be composed of the material with improved thermal conductivity. A targeted dissipation of heat can be achieved, in particular into a region where in particular an optimum heat dissipation by the tool or the tool receptacle can be expected (high air circulation, shaded side of the working appliance, close to the ground and/or in the region of the moist and/or cool grass etc.). Furthermore, a release of heat through the rest of the motor-receiving housing or through the main body can be at least reduced. In this way, little heat is released into the interior of the housing in particular between the upper and the lower housing shell. As it were, insulation is realized by means of the main body. A thermal bridge is provided by the cover or motor flange. In this way, overheating of the further electrical or electronic components, for example of the processing unit, of the battery or the like, which are in particular arranged within the housing, is avoided. An effective dissipation of heat from the motor-receiving housing, in particular of heat caused by the drive unit, is made possible.

It is proposed that the main body has a ventilation opening and/or an opening for receiving a ventilating means, wherein, in particular, this is arranged on that side of the main body which is averted from the cover.

It is proposed that a support unit at least for supporting the motor-receiving housing which receives the motor is provided, wherein, in particular, between the support unit and the motor, preferably between the support unit and the motor-receiving housing which receives the motor, there is/are arranged at least one, preferably multiple, elastic bearing and supporting element(s), preferably for supporting and bearing the drive unit with oscillation-decoupling action relative to the support unit.

A "support unit" is preferably to be understood to mean a unit which is provided for supporting forces, in particular for supporting forces of the drive unit and/or of the tool receptacle and/or of the tool. These are to be understood in particular to mean bearing and/or holding forces for example owing to the weight force and/or operating forces of the drive unit and/or tool receptacle and/or of the tool. During normal operation, these may for example be acceleration and braking forces of the drive unit, but in particular oscillations or vibrations and/or the like in particular of the drive unit and/or of the tool receptacle and/or of the tool. They may be forces which are caused for example by an imbalance of the tool receptacle, in particular of a tool receptacle in the form of a rotary disk and/or by the one or more tools fixed to the tool receptacle, and/or the like. An imbalance may be caused for example by manufacturing tolerances of the tools, may sometimes arise in particular at the tool receptacle owing to one tool in particular of a multiplicity of tools, preferably of a multiplicity of tools provided on the tool receptacle, having become relatively heavily worn and/or having fallen off, and/or the like. Furthermore, pressure forces, shock forces and/or impact forces which act in particular on the tool receptacle and/or on the tool can be supported by the support unit, for example during the cutting or commencement of cutting of a hard object. It is also possible for other forces, which act axially, radially and/or in a circumferential direction at least indirectly on the tool receptacle, to be supported by the support unit. The support unit preferably supports said forces at least indirectly on the chassis. The support unit is preferably designed to be height-adjustable. It is preferably guided linearly by means of a guide device. The guide device may be provided at least for rotationally inhibiting the support unit, in particular for rotationally inhibiting the motor-receiving housing, which is connected to the support unit, and/or motor housing of the motor. The guide device may be designed for preventing play between the support unit and the guide device. The guide device may for example guide a sliding seat of the height adjustment unit, in particular a sliding seat formed by the support unit, in particular impart such guidance at least with rotation-inhibiting action. The guide device advantageously has guide means which are of circumferentially elastic, in particular rotation-inhibiting form. Said guide means are provided for rotation-inhibiting and axial guidance at least of the motor housing, in particular of the motor-receiving housing, preferably of the sliding seat, relative to the chassis about or in a height adjustment axis direction. Said guide means are advantageously designed to be elastically displaceable in a circumferential direction about the height adjustment axis. The sliding seat is linearly displaceable, for the purposes of height adjustment, in the event of a rotation of a rotary body. The rotary body and the sliding seat advantageously have corresponding threads for this purpose. However, the sliding seat or the support unit or support device could in principle also be designed to be displaceable in some other way, for example by means of a device according to EP3167703, FIG. 5, in particular reference designations 30, 68, 70, 28, 64, 66.

An elastic bearing and supporting element is to be understood in particular to mean a damping element. This may be formed for example from an elastomer, a spring, a foamed material or the like. The elastic bearing and supporting element is provided for dampening vibrations and oscillations. Furthermore, it bears and supports the drive unit, or the motor-receiving housing which receives the drive unit. The expression "with oscillation-decoupling action" is to be understood in particular to mean that kinetic energy in the elastic bearing and supporting element is converted into heat and is transmitted at least in dampened fashion to the support unit or the chassis. In particular, said kinetic energy is absorbed by internal friction in the bearing and supporting element. In particular, a movement and/or oscillation of the drive unit and/or of the tool receptacle is at least partially decoupled from a movement and/or oscillation of the support unit and/or of the chassis.

It is proposed that the support unit is designed to be height-adjustable relative to the chassis, in particular so as to be height-adjustable in linearly displaceable fashion relative to the chassis, in particular height-adjustable together with the cutting device, the motor and/or the motor-receiving housing.

It is proposed that, between the chassis and a support unit, for holding and bearing the motor and/or for holding and bearing a motor-receiving housing which receives the motor, there are provided guide means for rotation-inhibiting and axial guidance of the support unit relative to the chassis about or in a height adjustment axis direction, wherein the one or more guide means are designed to be elastically displaceable in a circumferential direction about the height adjustment axis, wherein, preferably, the guide means are part of a guide device and/or of at least one guide element.

It is proposed that the lawnmower comprises a guide device which is formed separately from the chassis and which has at least one guide element which, in relation to a height adjustment axis of the height adjustment device, is designed for at least rotation-inhibiting axial guidance of a support unit or of a sliding seat and for at least axially inhibiting rotational guidance of a rotary body of the height adjustment device.

The working appliance can advantageously be operated more quietly. Noise emissions of the working appliance can thus be considerably reduced, in particular by several decibels, preferably by >5 dB, particularly preferably by >10 dB, in particular in relation to working appliances, preferably autonomous lawnmowers, according to the prior art. An unpleasant chattering and/or knocking and/or rattling can be avoided. Such noise can be caused for example because the tool receptacle, in particular the rotary disk and/or the tool, have an imbalance. In some cases, in the case of the tools, an imbalance arises owing to the abrasion or wear thereof. One of the for example multiple tool fastened to the tool receptacle or to the rotary disk may suffer wear or fracture and/or become blocked so as to be inhibited in terms of rotation or unrotatable, and/or may be lost. The tool receptacle or the tool may in particular become damaged as a result of the operation thereof, or be subject to other things which cause an imbalance. In the delivered state, the working appliance, in particular the tool receptacle and/or the tool and/or the cutting device, is typically balanced. In this respect, noise emissions over the service life and/usage duration of the working appliance can be optimized. The tool receptacle of an autonomous lawnmower may be formed as a rotary disk with a diameter of for example 150 to 300 mm. It may rotate at rotational speeds of 2000 to 4000 rpm. At its outer circumference, there may be arranged multiple tools, in particular blades, which are preferably rotatable relative to the rotary disk. An imbalance may occur and/or arise as a result of damage, uneven wear, dirt and/or grass accumulation, in particular on the tool and/or the tool receptacle and/or in between, as a result of movement restriction of the blades in particular causing by dirt and/or grass accumulation, and/or the like. A center of gravity of the cutting device or of the tool receptacle together with tool is can thus be eccentrically displaced relative to the axis of rotation of the drive unit and/or of the tool receptacle. This imbalance can, during the operation of the working appliance, cause in particular periodic displacement of the tool receptacle and of the drive unit connected thereto and/or of the motor-receiving housing which receives the motor in particular in fixedly connected fashion. By means of the refinement, these displacements in the transmission path to the chassis can be at least dampened. Particularly hard contact and/or a direct transmission of force and/or direct contact of the drive unit, in particular of the motor-receiving housing, which receives the drive unit, and of the support unit and/or of the chassis connected to the support unit, is prevented. An oscillation-decoupling action is attained. Hard contact between mechanically force-transmitting components is avoided. In this way, it is possible in particular for a chattering, knocking and/or other noise emissions to be avoided. It is thus possible for a working appliance, in particular an autonomous lawnmower, to be operated more quietly and/or in a manner which reduces damage to working appliance components. User-friendliness can thus be increased. Operation of the working appliance at night or during rest periods can be at least improved or made possible. The acceptance in particular of autonomous lawnmowers can be increased. In particular, a direct transmission of body-borne noise between cutting device and/or drive unit and/or the motor-receiving housing which receives the drive unit to the support unit and/or the chassis can be avoided or at least dampened.

Lawnmower (11), in particular autonomous lawnmower (11), having at least a chassis (45), a motor (15) received by a motor-receiving housing (36), and a cutting device (200) which can be driven by the motor (15), furthermore having a height adjustment device (16) for a displacement of the cutting device (200), of the motor-receiving housing (36) and of the motor (15) relative to the chassis (45), at least for setting a working height (h) of the cutting device (200), in particular for setting a cutting height (s) of a cutting tool (18) of the cutting device (200), wherein the motor-receiving housing (36) has a cover (52) and at least one main body (50), in particular a main body (50) in the form of a pot-shaped housing, characterized in that the cover (52) is provided for fixing the motor (15) on the motor-receiving housing (36).

It is proposed that the cover (52) is arranged between the cutting device (200) and a motor housing (33) of the motor (15).

It is proposed that the cover (52) is provided for receiving and/or fixing a drive shaft side of a motor housing (33) of the motor (15).

It is proposed that the cover (52) and the main body (50) are formed from materials with different thermal conductivity, wherein, in particular, the cover (52) is formed from a material with increased thermal conductivity, preferably with a thermal conductivity which is several times higher than the thermal conductivity of the main body (50), wherein, in particular, the main body (50) is formed from a thermally insulating material, in particular thermally insulating plastic.

It is proposed that the cover (52) is provided for preferably directly dissipating heat in the direction of a standing plane (56) of the lawnmower (11) and/or in the direction of the region of the cutting device (200), in particular in the direction of an air flow caused by the cutting device (200), in particular in the direction of an air flow caused by a tool (18) and/or a tool receptacle (12) of the cutting device (200).

It is proposed that the main body (50) has a ventilation opening and/or an opening for receiving a ventilating means (39), wherein, in particular, this is arranged on that side of the main body (50) which is averted from the cover (52), or on the base of said main body.

It is proposed that, between a support unit (100) and the motor-receiving housing (36) which receives the motor (15), there is/are arranged at least one, preferably multiple, elastic bearing and supporting element(s) (102), preferably for supporting and bearing the motor (15) with oscillation-decoupling action relative to the support unit (100).

It is proposed that the support unit (100) is designed to be height-adjustable relative to the chassis (45), in particular so as to be height-adjustable in linearly displaceable fashion relative to the chassis (45), in particular height-adjustable at least together with the cutting device (200), the motor (15) and/or the motor-receiving housing (36).

It is proposed that, between the chassis (45) and a support unit (100), for holding and bearing the motor and/or for holding and bearing a motor-receiving housing (36) which receives the motor (15), there are provided guide means (600) for rotation-inhibiting and axial guidance of the support unit (100) relative to the chassis (45) about or in a height adjustment axis direction, wherein the one or more guide means (600) are designed to be elastically displaceable in a circumferential direction (25) about the height adjustment axis (590), wherein, preferably, the guide means (600) are part of a guide device (19) and/or of at least one guide element (20).

It is proposed that the lawnmower (11) comprises a guide device (19) which is formed separately from the chassis (45) and which has at least one guide element (20) which, in relation to a height adjustment axis (590) of the height adjustment device (19), is designed for at least rotation-inhibiting axial guidance of a support unit (100) or of a sliding seat (204) and for at least axially inhibiting rotational guidance of a rotary body (118) of the height adjustment device.

A lawnmower is proposed, in particular the autonomous lawnmower, having at least a chassis, a motor for driving a cutting device and a height adjustment device for a displacement of the cutting device and of the motor, in particular of a motor-receiving housing which receives the motor, relative to the chassis, at least for setting a working height of the cutting device relative to the chassis, in particular for setting a cutting height of a cutting tool of the cutting device.

It is proposed that the lawnmower comprises a guide device which is formed separately from the chassis and which has a guide element which, in relation to a height adjustment axis of the height adjustment device, is designed for at least rotation-inhibiting axial guidance of a sliding seat and for at least axially inhibiting rotational guidance of a rotary body of the height adjustment device, in particular of a rotary body which drives the sliding seat.

It is proposed that, between the chassis and a support unit or a sliding seat, for holding and bearing the motor and/or for holding and bearing a motor-receiving housing which receives the motor, there are provided guide means for rotation-inhibiting and axial guidance of the support unit or of the sliding seat relative to the chassis about or in a height adjustment axis direction, wherein the one or more guide means are designed to be elastically displaceable in a circumferential direction about the height adjustment axis, wherein, preferably, the guide means are part of a guide device and/or of at least one guide element.

It is advantageously possible for tolerance deviations, in particular in the production of the chassis and/or of the sliding seat, to be selected to be relatively coarse. Noise emissions of the lawnmower can be improved. A transmission of vibrations from the cutting device and/or motor to the chassis is reduced. The loading for the cutting device, the drive, the height adjustment device and/or the chassis can be reduced.

Sliding seat and rotary body have corresponding threads such that a rotation of the rotary body results in a linear displacement of the sliding seat. In particular, the rotary body surrounds the sliding seat. For this purpose, the rotary body has an external thread and the sliding seat has an internal thread. In principle, the rotary body may also surround the sliding seat. Then, the sliding seat could have an internal thread and the rotary body could have an external thread. Alternatively, sliding seat and rotary body may also each have external threads or some other configuration.

It is proposed that the guide device has multiple, in particular two, guide elements, in particular guide elements which are situated opposite one another in relation to the height adjustment axis. In this way, it is possible to ensure reliable guidance, for example without tilting. Assembly is easily possible owing to the separability of the guide elements.

It is proposed that the guide device or guide elements are fixedly connectable, in particular connected by screw connection and/or in positively locking fashion, to the chassis. In this way, a reliable transmission of force from the guide device or the one or more guide elements to the chassis is possible.

It is proposed that the guide device is provided for receiving the height adjustment device in spaced-apart fashion and/or with oscillation-decoupling action on the chassis, in particular for receiving the height adjustment device in spaced-apart fashion and/or with oscillation-decoupling, bearing and supporting action on the chassis, preferably for receiving at least the height adjustment device, the motor and the cutting device in spaced-apart fashion and/or with oscillation-decoupling, bearing and supporting action on the chassis. In this way, a transmission of vibrations from the cutting device and/or the drive unit to the chassis can be reduced, and/or a generation of noise on/by the lawnmower can be reduced.

It is proposed that the guide device or the one or more guide elements has at least one, preferably multiple, elastically displaceable guide means, in particular axially, radially and/or circumferentially elastically displaceable guide means, designed in particular with displacement-inhibiting action in an axial or radial or circumferential direction in relation to a height adjustment axis of the height adjustment device. A damping action can be attained by means of the elastic displaceability. Forces can be transmitted in cushioned fashion to the chassis. This protects the involved components of the lawnmower, in particular the chassis, the height adjustment device, the motor-receiving housing, the motor and/or the cutting device. In particular in the case of high load or overload, the action of force on the involved components can be dampened. Rattling or the like can be avoided. Noise emissions of the lawnmower are improved.

It is proposed that the one or more guide means is/are, at least for the rotation-inhibiting axial guidance of the sliding seat, designed to be displaceable in circumferentially elastic fashion, in particular displaceable in circumferentially and radially elastic fashion. In this way, it is the case, as it were, that noise emissions are at least reduced. Owing to the radially elastic displaceability, it is possible for not only moment forces but also radial forces to be dampened or cushioned.

It is proposed that the one or more guide means is/are attached in lug-like fashion to the guide element, in particular is/are attached in circumferentially and radially elastically displaceable fashion to the guide element. This attachment allows an expedient structural form. No additional spring elements or the like are required. An integral configuration with the guide element is easy to achieve. Demoldability is relatively straightforward.

It is proposed that the one or more guide means is/are formed as a guide profile, in particular as a guide rail, in particular as a sliding guide rail. In this way, the transmission of force can take place over an area. Axial guidance is easily possible.

It is proposed that, on the sliding seat, at least one, preferably multiple, corresponding guide means, which is/are non-elastically displaceable in a circumferential direction and/or in a radial direction relative to the height adjustment axis, in particular guide means corresponding to the guide means of the guide device, are provided, in particular guide means formed as a guide profile, in particular as a guide rail, preferably as a sliding guide rail. The guide means of the sliding seat and of the guide elements are advantageously designed to be free from play with respect to one another, in particular preloaded. In this way, a generation of noise, for example rattling, can be prevented, and the freedom of the mobility of the sliding seat is restricted in defined fashion.

It is proposed that the one or more guide means is/are formed as a single piece with the guide element or sliding seat. It is advantageously thus possible for at least the number of parts to be reduced and/or for the stability of the guide means and guide element to be increased.

It is proposed that, between the chassis and a motor housing of the motor, in particular between the chassis and a motor-receiving housing, preferably between the chassis and a support unit or a sliding seat for holding and bearing the motor and/or the motor-receiving housing, there are provided guide means for rotation-inhibiting and axial guidance at least of the motor housing, in particular of the motor-receiving housing, preferably of the sliding seat, relative to the chassis about or in the height adjustment axis direction, wherein the one or more guide means are designed to be elastically displaceable in the circumferential direction about the height adjustment axis.

By virtue of the fact that the guide means is/are designed to be elastically displaceable in a circumferential direction about the height adjustment axis, it is possible for moment forces of the motor or of the cutting device to be transmitted in dampened fashion to the guide device and/or the chassis. The guide device is advantageously fixedly connected to the chassis, for example by positive locking and/or frictional locking and/or the like. The positive-locking means could however also be formed as a single piece with the chassis and designed to be elastically displaceable relative thereto. It is advantageously possible for not only moment forces but also radial forces to be transmitted in dampened fashion to the guide device and/or the chassis. It would also be possible for guide means to be formed as a single piece with the sliding seat and/or the chassis.

It is proposed that the one or more guide means are designed to be elastically displaceable transversely, in particular tangentially or in a circumferential direction and/or radially, with respect to the height adjustment axis. In this way, said guide means can allow in particular the support unit or the sliding seat to be received in circumferentially elastic fashion. Axial guidance can be ensured. A rotation-inhibiting action can be attained. The expression "rotation-inhibiting" is to be understood to mean that elastic flexibility in a direction of rotation is possible, in particular for the purposes of resilient and/or damping support, but a rotation is substantially prevented. For example, a rotation-inhibiting action is prevented after a few angular degrees. In particular, one eighth, quarter or a greater rotation is prevented. The guide means and/or guide device allow sliding guidance. They constitute a bearing arrangement, in particular slide bearing arrangement, preferably axial or linear slide bearing arrangement.

It is proposed that the one or more guide means is/are a constituent part of a guide device. A guide device may in particular perform further tasks, for example the rotational guidance of a rotary body. It may furthermore have radially elastic guide means. It may be formed from a different material than the support unit, the sliding seat and/or the chassis. The guide device is advantageously arranged as a separate component between chassis and support unit. The guide device can serve for damping and/or reduction of noise emissions.

It is proposed that the one or more rotation-inhibiting guide means is/are formed as a guide profile, in particular guide rail, in particular sliding guide rail. This/these is/are advantageously arranged parallel to the height adjustment axis. They advantageously form a guide surface and/or sliding surface which interact with corresponding guide profiles on the support unit or the sliding seat. The guide profile on the support unit or the sliding seat advantageously forms a wedge-shaped groove with the outer lateral surface thereof. The guide profile of the guide device is advantageously received between the guide profile of the support unit and the sliding seat, in particular is designed to be able to be clamped thereby. In particular, a displacement of the support unit or of the sliding seat in the direction of the guide device gives rise to a contact stress and increases the capability for force transmission in particular by frictional engagement. In particular, in this way, play-free contact of the corresponding guide profiles against the sliding seat and on the guide device can be made possible.

It is proposed that the guide means is of lug-like form and/or is attached in lug-like fashion to a guide device, in particular is formed as a single piece therewith. The lug-like attachment is provided by means of an attachment at one of four sides, in particular such that it is designed to be pivotable about the attachment region. At the three further sides, the lug is designed to be separate from the rest of the guide element.

It is proposed that at least one, preferably multiple, corresponding guide means displaceable in non-elastic fashion in the circumferential direction and/or in the radial direction relative to the height adjustment axis, in particular corresponding guide profiles, are provided on the motor housing, motor-receiving housing or sliding seat. Said guide profiles may be formed from a different, in particular stronger material. A material thickness can be greater. Furthermore, a reliable transmission of force to the guide elements can be made possible. In the event of overload, it is in some cases ensured that the guide device or elastically displaceable guide means are first to sustain damage, which can lower repair costs.

It is proposed that the guide device or guide element of the guide device has a radially elastic form-fit element. This may be in the form of a lug. It is formed as a single piece with the guide element. It is attached at one of four sides, in particular so as to be pivotable about the attachment region. At the three further sides, it is separated from the rest of the guide element by a groove. In this way, the support unit can additionally be positioned in a play-free manner relative to the guide device or the guide element and/or at least radially centered. In particular in the presence of relatively high loads, it or the lug serves as an elastic support of the support unit radially with respect to the height adjustment axis.

It is proposed that the guide device is provided for in particular elastically axially inhibiting rotational guidance of a rotary body of the height adjustment device, in particular elastically axially inhibiting rotational guidance of a rotary body which drives the sliding seat. The sliding seat is linearly displaceable, for the purposes of height adjustment, in the event of a rotation of the rotary body. The rotary body and the sliding seat advantageously have corresponding threads for this purpose. However, the sliding seat or the support device could in principle also be designed to be displaceable in some other way, for example by means of a device according to EP3167703, FIG. 5, in particular reference designations 30, 68, 70, 28, 64, 66.

Owing to the elastically axially inhibiting rotational guidance, vibrations of the rotary body in the transmission path to the chassis can be dampened. This serves for a reduction in noise emissions. The rotary guide is advantageously received in slidingly mounted fashion. The elastic receiving is advantageously provided by axially elastically displaceable guide means or elastic axial positive-locking elements, in particular lugs or the like. In order that the rotary body or a ring section of the rotary body can rotate in the rotary guide or in the rotary seat, this has a certain degree of play. The axially elastic guide means narrow the axial spacing of the rotary guide elements at least in the region of the arrangement thereof. A degree of play can thus be partially reduced. An axial displacement is possible elastically, until the rotary body abuts against the non-displaceable rotary guide or rotary guide elements or the non-displaceable rotary seat. In this respect, an elastically axially inhibiting rotary guide can be provided. It is designed to be elastic in a limited displacement range owing to the axially elastic guide means and so as to be inelastic or axially non-displaceable in a range that goes beyond this. The rotary body is advantageously connected to the ring section, in particular formed as a single piece therewith.

Lawnmower (11), in particular autonomous lawnmower (11), having at least a chassis (45), a motor (15) for driving a cutting device (200), and a height adjustment device (16) for a displacement of the cutting device (200) and of the motor (15), in particular of a motor-receiving housing (36) which receives the motor (15), relative to the chassis (45), at least for setting a working height (h) of the cutting device (200) relative to the chassis (45), in particular for setting a cutting height (s) of a cutting tool (18) of the cutting device (200), characterized in that the lawnmower (11) comprises a guide device (19) which is formed separately from the chassis (45) and which has at least one guide element (20) which, in relation to a height adjustment axis (590) of the height adjustment device (16), is designed for at least rotation-inhibiting axial guidance of a sliding seat (204) and for at least axially inhibiting rotational guidance of a rotary body (118) of the height adjustment device (16).

Lawnmower (11), in particular autonomous lawnmower (11), having at least a chassis (45), a motor (15) for driving a cutting device (200), and a height adjustment device (16) for a displacement of the cutting device (200) and of the motor (15), in particular of a motor-receiving housing (36) which receives the motor (15), relative to the chassis (45), at least for setting a working height (h) of the cutting device (200) relative to the chassis (45), in particular for setting a cutting height (s) of a cutting tool (18) of the cutting device (200), characterized in that, between the chassis (45) and a support unit (100) or a sliding seat (204), for holding and bearing the motor (15) and/or for holding and bearing a motor-receiving housing (36) which receives the motor (15), there are provided guide means (600) for rotation-inhibiting and axial guidance of the support unit (100) or of the sliding seat (204) relative to the chassis (45) about or in a height adjustment axis direction (590), wherein the one or more guide means (600) are designed to be elastically displaceable in a circumferential direction about the height adjustment axis (590), wherein, preferably, the guide means (600) are part of a guide device (19) and/or of at least one guide element (20).

It is proposed that the guide device (19) has multiple, in particular two, guide elements (19), in particular guide elements (20) which are situated opposite one another in relation to the height adjustment axis (590).

It is proposed that the guide device (19) or the one or more guide elements (20) are fixedly connectable, in particular connected by screw connection and/or in positively locking fashion, to the chassis (45).

It is proposed that the guide device (19) is provided for receiving the height adjustment device (16) in spaced-apart fashion and/or with oscillation-decoupling action on the chassis (45), in particular for receiving the height adjustment device (16) in spaced-apart fashion and/or with oscillation-decoupling, bearing and supporting action on the chassis (45), preferably for receiving at least the height adjustment device (16), the motor (15) and the cutting device (200) in spaced-apart fashion and/or with oscillation-decoupling, bearing and supporting action on the chassis (45).

It is proposed that the guide device (19) or the one or more guide elements (20) has/have at least one, preferably multiple, elastically displaceable guide means (112, 600), in particular axially, radially and/or circumferentially elastically displaceable guide means (112, 600), designed in particular with displacement-inhibiting action in an axial or radial and/or in a circumferential direction (25) in relation to a height adjustment axis (590) of the height adjustment device (16), in order to act at least on a rotary body (118) and/or a sliding seat (204) of the height adjustment device (16).

It is proposed that the one or more guide means (600) is/are, at least for the rotation-inhibiting axial guidance of the sliding seat (204), designed to be displaceable in circumferentially elastic fashion, in particular displaceable in circumferentially and radially elastic fashion.

It is proposed that the one or more guide means (600) is/are attached in lug-like fashion to the guide element (20), in particular is/are attached in circumferentially and radially elastically displaceable fashion to the guide element (20).

It is proposed that the one or more guide means (600) is/are formed as a guide profile (60), in particular as a guide rail, in particular as a sliding guide rail.

It is proposed that, on the sliding seat (204), at least one, preferably multiple, in particular corresponding guide means (610), which is/are non-elastically displaceable in a circumferential direction (25) and/or in a radial direction relative to the height adjustment axis (590), in particular guide means (610) formed as a guide profile (61), in particular as a guide rail, preferably as a sliding guide rail.

It is proposed that the one or more guide means (600, 610) is/are formed as a single piece with the guide element (20) or the sliding seat (204).

A working appliance is proposed, preferably autonomous working appliance, in particular lawnmower, preferably autonomous lawnmower, having a chassis, having a tool receptacle, having a drive unit for driving the tool receptacle and having a height adjustment unit which is provided for setting a working height, in particular a cutting height, of a tool received by the tool receptacle, wherein a support unit at least for supporting the drive unit is provided, and the support unit with the drive unit and the tool receptacle are designed to be height-adjustable relative to the chassis, in particular height-adjustable in linearly displaceable fashion relative to the chassis.

It is proposed that, between the support unit and the drive unit, in particular between the support unit and a motor-receiving housing which receives the drive unit, there is/are arranged at least one, preferably multiple, elastic bearing and supporting element(s), in particular for supporting and bearing at least the drive unit, preferably the motor-receiving housing which receives the drive unit, relative to the support unit with oscillation-decoupling action.

A "working appliance" is to be understood in particular to mean an appliance for performing work, for example in a garden and/or household environment. The working appliance may preferably be a lawnmower, scarifier, floor cleaner or the like. A "chassis" is to be understood in particular to mean a running gear with wheels received thereon. Said wheels may be provided for rolling and/or may be partially or fully driven. A lawnmower may for example be in the form of a push-type lawnmower with or without a propulsion drive or in the form of an autonomous lawnmower with propulsion drive. The chassis may however also constitute the suspension and/or a frame for other propulsion or support means which are received thereon, for example articulated arms for a manner of propulsion based on walking, one or more rotors for a flying manner of propulsion, or the like. The chassis may serve as a frame for the suspension and/or fixing of the propulsion means and/or of further components of the working appliance, for example for a power supply, an open-loop or closed-loop control means, a body, for working and propulsion drives, and/or the like. Here, an "autonomous working appliance" is to be understood in particular to mean an appliance which propels itself, orients itself and/or navigates automatically in an area and/or in an environment, in particular after a learning process. The expression "automatically propel itself, orient itself and/or navigate" is to be understood here in particular to mean that the working appliance propels itself, orients itself and/or navigates, in particular after a learning process, without human intervention. Preferably, the autonomous working appliance is in the form of an autonomous lawnmower which is provided for traveling and/or performing work on, in particular mowing or scarifying, a working surface, in the form of a lawn area, and/or a working environment in the form of a garden environment.

A "tool receptacle" is to be understood in particular to mean a device for holding a tool. This is preferably to be understood to mean a device to which a tool can be fastened. A tool is preferably captively fastened to the tool receptacle. The tool is preferably furthermore driven by means of the tool receptacle. The tool is preferably formed by one or more blades. Furthermore, various drive units which appear expedient to a person skilled in the art are conceivable, but the drive unit is preferably formed by a motor, in particular an electric motor. The drive unit serves in particular for driving the tool. A drive force of the drive unit is preferably transmitted via the tool receptacle to the tool. Tool receptacle and/or tool form parts of a cutting device.

A "height adjustment unit" is to be understood in particular to mean a unit which is provided for setting a working height of the working appliance. A height adjustment unit may also be referred to as height adjustment device. The height adjustment unit is preferably to be understood to mean a unit which is provided for setting a working height, in particular a cutting height, of a tool, which is received by the tool receptacle, relative to an underlying surface, or for setting a working or cutting height of a cutting device. Here, a setting is in particular performed manually by an operator, though may also be implemented automatically or by manual initiation and mechanical implementation, for example by means of a height adjustment motor or the like. The height adjustment unit is preferably provided for tool-free setting of a working height, in particular of a cutting height, of a tool or of a cutting device, which is received by the tool receptacle, relative to an underlying surface and/or relative to the chassis. Here, the working height is preferably defined by a plane which runs parallel to an underlying surface and/or to a standing plane of the autonomous working appliance and in which a lowest point of the tool lies. The expression "provided" is to be understood in particular to mean specially configured and/or equipped. The statement that an object is provided for a particular function is to be understood in particular to mean that the object performs and/or carries out said particular function in at least one state of use and/or operating state. By means of the height adjustment unit, it is advantageously possible for the drive unit and/or the motor-receiving housing, which receives the drive unit, to be adjusted in terms of height. In particular, to the motor-receiving housing, there may also be fixed a catching guard, in particular for catching parts of the components, and/or of components fixed to the tool receptacle which become detached, and/or for catching cut material or the like.

A "support unit" is preferably to be understood to mean a unit which is provided for supporting forces, in particular for supporting forces of the drive unit and/or of the tool receptacle and/or of the tool. These are to be understood in particular to mean bearing and/or holding forces for example owing to the weight force and/or operating forces of the drive unit and/or tool receptacle and/or of the tool. During normal operation, these may for example be acceleration and braking forces of the drive unit, but in particular oscillations or vibrations and/or the like in particular of the drive unit and/or of the tool receptacle and/or of the tool. They may be forces which are caused for example by an imbalance of the tool receptacle, in particular of a tool receptacle in the form of a rotary disk and/or by the one or more tools fixed to the tool receptacle, and/or the like. An imbalance may be caused for example by manufacturing tolerances of the tools, may sometimes arise in particular at the tool receptacle owing to one tool in particular of a multiplicity of tools, preferably of a multiplicity of tools provided on the tool receptacle, having become relatively heavily worn and/or having fallen off, and/or the like. Furthermore, pressure forces, shock forces and/or impact forces which act in particular on the tool receptacle and/or on the tool can be supported by the support unit, for example during the cutting or commencement of cutting of a hard object. It is also possible for other forces, which act axially, radially and/or in a circumferential direction at least indirectly on the tool receptacle, to be supported by the support unit. The support unit preferably supports said forces at least indirectly on the chassis. The support unit is preferably designed to be height-adjustable. It is preferably guided linearly by means of a guide device. The guide device may be provided at least for rotationally inhibiting the support unit, in particular for rotationally inhibiting the motor-receiving housing, which is connected to the support unit, and/or motor housing of the motor. The guide device may be designed for preventing play between the support unit and the guide device. The guide device may for example guide a sliding seat of the height adjustment unit, in particular a sliding seat formed by the support unit, in particular impart such guidance at least with rotation-inhibiting action. The guide device advantageously has guide means which are of circumferentially elastic, in particular rotation-inhibiting form. Said guide means are provided for rotation-inhibiting and axial guidance at least of the motor housing, in particular of the motor-receiving housing, preferably of the sliding seat, relative to the chassis about or in a height adjustment axis direction. Said guide means are advantageously designed to be elastically displaceable in a circumferential direction about the height adjustment axis. The sliding seat is linearly displaceable, for the purposes of height adjustment, in the event of a rotation of a rotary body. The rotary body and the sliding seat advantageously have corresponding threads for this purpose. However, the sliding seat or the support unit or support device could in principle also be designed to be displaceable in some other way, for example by means of a device according to EP3167703, FIG. 5, in particular reference designations 30, 68, 70, 28, 64, 66.

An elastic bearing and supporting element is to be understood in particular to mean a damping element. This may be formed for example from an elastomer, a spring, a foamed material or the like. The elastic bearing and supporting element is provided for dampening vibrations and oscillations. Furthermore, it bears and supports the drive unit, or the motor-receiving housing which receives the drive unit. The expression "with oscillation-decoupling action" is to be understood in particular to mean that kinetic energy in the elastic bearing and supporting element is converted into heat and is transmitted at least in dampened fashion to the support unit or the chassis. In particular, said kinetic energy is absorbed by internal friction in the bearing and supporting element. In particular, a movement and/or oscillation of the drive unit and/or of the tool receptacle is at least partially decoupled from a movement and/or oscillation of the support unit and/or of the chassis.

An "actuating element" is to be understood in this context in particular to mean an element which is provided for actuation by an operator. This is preferably to be understood to mean an element which is rotated by an operator. The actuating element may however also be an HMI, be it directly on the working appliance or on an app for example of a smart device or the like, which in turn initiates a motor adjustment of the working height. Some other form of actuation that appears expedient to a person skilled in the art would however basically also be conceivable. The expression "substantially" is to be understood in particular to mean that a deviation from a predefined value is in particular less than 25%, preferably less than 10% and particular preferably less than 5% of the predefined value.

The working appliance can advantageously be operated more quietly. Noise emissions of the working appliance can thus be considerably reduced, in particular by several decibels, preferably by >5 dB, particularly preferably by >10 dB, in particular in relation to working appliances, preferably autonomous lawnmowers, according to the prior art. An unpleasant chattering and/or knocking and/or rattling can be avoided. Such noise can be caused for example because the tool receptacle, in particular the rotary disk and/or the tool, have an imbalance. In some cases, in the case of the tools, an imbalance arises owing to the abrasion or wear thereof. One of the for example multiple tool fastened to the tool receptacle or to the rotary disk may suffer wear or fracture and/or become blocked so as to be inhibited in terms of rotation or unrotatable, and/or may be lost. The tool receptacle or the tool may in particular become damaged as a result of the operation thereof, or be subject to other things which cause an imbalance. In the delivered state, the working appliance, in particular the tool receptacle and/or the tool and/or the cutting device, is typically balanced. In this respect, noise emissions over the service life and/usage duration of the working appliance can be optimized. The tool receptacle of an autonomous lawnmower may be formed as a rotary disk with a diameter of for example 150 to 300 mm. It may rotate at rotational speeds of 2000 to 4000 rpm. At its outer circumference, there may be arranged multiple tools, in particular blades, which are preferably rotatable relative to the rotary disk. An imbalance may occur and/or arise as a result of damage, uneven wear, dirt and/or grass accumulation, in particular on the tool and/or the tool receptacle and/or in between, as a result of movement restriction of the blades in particular causing by dirt and/or grass accumulation, and/or the like. A center of gravity of the cutting device or of the tool receptacle together with tool is can thus be eccentrically displaced relative to the axis of rotation of the drive unit and/or of the tool receptacle. This imbalance can, during the operation of the working appliance, cause in particular periodic displacement of the tool receptacle and of the drive unit connected thereto and/or of the motor-receiving housing which receives the motor in particular in fixedly connected fashion. By means of the refinement, these displacements in the transmission path to the chassis can be at least dampened. Particularly hard contact and/or a direct transmission of force and/or direct contact of the drive unit, in particular of the motor-receiving housing, which receives the drive unit, and of the support unit and/or of the chassis connected to the support unit, is prevented. An oscillation-decoupling action is attained. Hard contact between mechanically force-transmitting components is avoided. In this way, it is possible in particular for a chattering, knocking and/or other noise emissions to be avoided. It is thus possible for a working appliance, in particular an autonomous lawnmower, to be operated more quietly and/or in a manner which reduces damage to working appliance components. User-friendliness can thus be increased. Operation of the working appliance at night or during rest periods can be at least improved or made possible. The acceptance in particular of autonomous lawnmowers can be increased. In particular, a direct transmission of body-borne noise between cutting device and/or drive unit and/or the motor-receiving housing which receives the drive unit to the support unit and/or the chassis can be avoided or at least dampened.

An outer contour of the drive unit and/or of the motor-receiving housing which receives the drive unit is advantageously spaced apart from an inner contour of the support unit and/or of the chassis by the bearing and supporting elements. During normal operation of the working appliance, it is the case, so to speak, that a minimum spacing between the components is attained, such that no direct transmission of oscillations and/or at least only a dampened transmission of noise from the drive unit and/or the motor-receiving housing to the chassis is possible. Furthermore, forces acting on the tool, the tool receptacle, the drive unit, the height adjustment device, the chassis and/or the working appliance, in particular overloads, can be lessened or at least reduced. The service life of the components or of the working appliance can thus be increased. In particular, forces caused by impacts acting on the tool, for example if the tool strikes a hard object, the tool receptacle is suddenly blocked, and/or other irregular loads arise, which forces act in particular at least indirectly on the tool receptacle, can be dampened.

It is proposed that the drive unit and/or the tool receptacle and/or the cutting device and/or the motor-receiving housing which receives the drive unit are/is received or borne on the support unit exclusively via the one or more elastic bearing and supporting elements. This applies in particular to normal working operation of the working appliance, in particular lawn-cutting operation. For normal operation, it is preferably also the case that no further bearing or supporting elements aside from the one or more bearing and supporting elements between the drive unit and/or the tool receptacle and/or the motor-receiving housing, which receives the drive unit, and the support unit are provided. The drive unit and/or the tool receptacle and/or the motor-receiving housing which receives the drive unit are, so to speak, mounted in floating fashion relative to the support unit or the chassis. This floating mounting or receiving is advantageously attained at least by means of the one or more elastic bearing and supporting elements. The mounting and/or support and/or damping may however be further improved by means of the guide device for the elastically rotation-inhibiting axial guidance of the support unit or of the sliding seat. It may furthermore be improved by means of a guide device which guides the rotary body with elastically axially inhibiting action.

It is proposed that the one or more elastic bearing and supporting elements and/or the drive unit and/or the motor-receiving housing, which receives the drive unit, and/or the support unit are designed to support the drive unit relative to the support unit in an axial direction along the height adjustment axis direction, radially with respect thereto and/or in the circumferential direction with respect thereto, preferably in opposite circumferential directions with respect thereto. The bearing and supporting elements are, for this purpose, received in particular in preloaded fashion, in particular between the motor-receiving housing and the support unit. The preload may be attained for example by virtue of the support unit being constructed from two half-shells which, when these are connected, in particular when these are screwed together, compress or preload the elastic bearing and supporting elements. Other constructions, methods or assembly methods are likewise conceivable for preloading the bearing and supporting elements. By means of the support in the axial direction, the weight force at least of the drive unit and tool receptacle, and other forces acting in the axial direction, can be accommodated. By means of the support in the radial direction, forces, in particular acceleration forces in the radial direction, preferably caused by an imbalance and/or eccentricity of the cutting device (tool receptacle and tool), and/or caused during the start-up and braking of the working appliance, but in particular forces in the radial direction caused in the event of impacting against or contact with a hard resistance, can be supported. The support in the circumferential direction, in particular in opposite circumferential directions, is advantageous in order to support the forces acting as a result of the acceleration and inertial forces of the drive unit and/or of the tool receptacle, for example during the switching-on and switching-off of the drive unit and/or the forces in the event of contact of hard objects at least with the tool and/or the circumferential forces caused by an imbalance and/or eccentricity of the cutting device.

It is proposed that the one or more elastic bearing and supporting elements and/or one or more receiving devices for the one or more elastic bearing and supporting elements are arranged on the drive unit and/or on the motor-receiving housing, which receives the drive unit, and/or on the support unit in different planes, which are in particular offset in parallel. The planes which are offset in parallel are preferably oriented substantially parallel to the horizontal planes or standing plane of the working appliance—that is to say substantially transversely with respect to the height adjustment axis direction. One plane, in particular both planes, advantageously intersects the motor shaft or the motor housing of the motor in one, in particular both, axial end regions of the motor housing. In particular, multiple, advantageously six to eight elastic bearing and supporting elements are provided. These may be distributed, in particular at regular intervals, in two planes which are offset in parallel. In the case of eight bearing and supporting elements, it is advantageously the case that at least one elastic bearing and supporting element is arranged in each quadrant, in particular per plane. A quadrant is defined here by the X and Y axes of a coordinate system, wherein the Z axis is oriented normally with respect to the standing plane. In the circumferential direction about the drive unit or the drive shaft of the drive unit, a quadrant change occurs every 90°, such that the four quadrants form a circle, or 360°. It is preferable for one elastic bearing and supporting element to be arranged in each plane in each quadrant. Particularly effective support can be realized in this way. A wobbling movement can advantageously be at least curtailed. In the case of multiple bearing and supporting elements, it is advantageously the case that a force-transmitting surface area on the drive unit, the motor-receiving housing and/or the support unit is reduced. An isolating action between the components connected by the bearing and supporting elements, in particular with regard to transmission of heat, noise and/or vibration, can thus be improved. The bearing and supporting elements may be formed as a block, as a spring, as a circular body, as a square-shaped body or as a rectangular body or the like. They may have a polygonal, circular and/or hollow geometry or the like. They may also have other shapes or geometries. They may for example be formed from rubber, foamed material, elastic synthetic or natural substances or some other elastic material. The bearing and supporting elements are advantageously arranged at regular intervals and/or angles, in particular about an axis of rotation of the drive unit.

It is proposed that the one or more bearing and supporting elements and/or the one or more receiving devices for the one or more elastic bearing and supporting elements in quadrants which are adjacent in the circumferential direction are provided for supporting forces in opposite circumferential directions about the height adjustment axis. In this way, the support characteristics can be improved. For example, the receiving devices may be shaped so as to be optimized in terms of geometrical moment of inertia for forces in the circumferential direction, for example by means of webs and transverse webs which support the bearing and supporting element(s) and which extend in the circumferential direction.

It is proposed that overload protection means, in particular positive-locking means, for example abutment means, preferably corresponding abutment means, are provided on the drive unit or the motor-receiving housing, which receives the drive unit, and/or the support unit. In this way, loads which exceed a threshold value can be accommodated and/or cushioned. These can enter into engagement if a maximum setpoint deformation of the elastic bearing and supporting elements is attained. They can transmit the forces, at least partially bypassing the elastic bearing and supporting elements, to the support unit and/or to the chassis. In this state, the oscillation-decoupling action is at least impaired. However, it is advantageously possible for an overload, in particular a plastic deformation, damage and/or a fracture, of components of the working appliance to be avoided. An overload of the elastic bearing and supporting elements can be avoided. In this way, the functionality thereof can advantageously be ensured over a longer period of time. The overload protection means are formed in particular as means which have a positively locking action axially, radially and/or tangentially or in the circumferential direction with respect to the axis of rotation of the drive unit and/or height adjustment axis of the height adjustment device. For example, one or more ribs may be provided which are formed on the motor-receiving housing in an axial-radial direction and/or transversely with respect thereto in a tangential-radial direction. The movement thereof can, in an axial, radial and/or tangential (circumferential direction) direction, be blocked or inhibited by these axially, radially and/or tangentially overlapping positive-locking elements, for example ribs, in particular on the support unit and/or motor housing unit, at least in the event of corresponding displacement, or the like.

It is proposed that the motor-receiving housing at least partially, in particular completely, surrounds the drive unit, in particular a motor of the drive unit. It is proposed that the motor-receiving housing is formed as a main body with cover, in particular as a pot-shaped housing with cover. The cover forms the flange for the drive unit, in particular the motor flange for the drive unit. It is proposed that the cover is arranged between the drive unit and the tool receptacle. Furthermore, the motor-receiving housing can close off the drive unit in water-tight fashion, in particular in water-tight and air-permeable fashion. It is proposed that a seal, in particular a static seal, is arranged between the cover or motor flange and the main body or pot-shaped housing. For this purpose, it is for example possible for sealing means, in particular compression sealing means, to be provided. It is furthermore proposed that a rotary seal, for example a radial seal, is provided between cover or motor flange and the drive shaft which projects through this and which serves for driving the tool receptacle or cutting device. Furthermore, the motor-receiving housing, in particular the main body, preferably the main body formed as a pot-shaped housing, may have a venting means in particular on a side situated opposite the cover or motor flange, preferably for the water-tightness and air permeability.

It is proposed that the cover or motor flange is formed from a different material, in particular in terms of thermal conductivity, than the main body or pot-shaped housing, in particular a material with higher thermal conductivity, preferably a thermal conductivity which is several times higher than the thermal conductivity of the main body or pot-shaped housing, for example from a plastic with increased thermal conductivity, a composite material, a metal, in particular at least aluminum-containing metal or the like. The thermal conductivity of the cover or motor flange is preferably in the range of that of aluminum alloys. A heat flow in the motor-receiving housing can thus be diverted. A part of the motor-receiving housing, in particular the cover or motor flange, can thus serve at least as a part of the cooling system. The cover dissipates heat in the direction of the standing plane or in the direction of the tool receptacle, in particular in the direction of an air flow caused by the tool or the tool receptacle. The cover is in direct contact with air or with an air flow at an underside of the working appliance. The air flow is advantageously caused by the working appliance, in particular a tool receptacle and/or the tool. The main body or the pot-shaped housing is advantageously formed from a material which is at least insulating from a thermal conductivity aspect, for example plastic, in particular a thermally insulating material and/or plastic. By virtue of the fact that the motor-receiving housing or the main body and cover 52 have/has different materials, it is possible on the one hand to provide an insulation action, and on the other hand to provide heat conduction. The cover or motor flange, which is in particular in contact with the air flow caused by the tool receptacle and/or the tool, dissipates heat. The main body or the rest of the motor-receiving housing or the housing pot, which is arranged in the interior of the housing of the working appliance, is at least insulating and/or at least has an insulating action. It is advantageous for only the cover or motor flange to be composed of the material with improved thermal conductivity. In this way, costs can be saved, because not the entire motor-receiving housing or the main body has to be formed from thermally conductive material. A targeted dissipation of heat can be achieved, in particular into a region where an optimum heat dissipation by the tool or the tool receptacle in particular can be expected (high air circulation, shaded side of the working appliance, close to the ground and/or in the region of the moist and/or cool grass etc.). Furthermore, a release of heat through the rest of the motor-receiving housing or through the main body can be at least reduced. In this way, little heat is released into the interior of the housing in particular between the upper and the lower housing shell. As it were, insulation is realized by means of the main body. A thermal bridge is provided by the cover or motor flange. In this way, overheating of the further electrical or electronic components, for example of the processing unit, of the battery or the like is avoided. An effective dissipation of heat from the motor-receiving housing, in particular of heat caused by the drive unit, is made possible.

It is proposed that the support unit at least partially, preferably completely, radially surrounds the drive unit and/or the motor-receiving housing, in particular at least partially, preferably completely along the axial extent of the drive unit and/or of the motor-receiving housing.

It is proposed that the cover is provided for fixing the motor. The cover fixes the motor on the motor-receiving housing. In this way, accessibility to the motor for maintenance purposes can be improved. The component that receives the motor—in this case the cover—typically has a relatively small volume, in particular it encloses a relatively small volume. The production of a cover can thus be less expensive, and/or the amount of material required for the cover can be less, in particular than for a main body which receives the motor. Furthermore, characteristics with regard to heat transport through the cover and/or prevention of heat transport through the main body can be easily provided. The cover can be optimized in terms of strength for the receiving and/or fixing and/or thermal attachment of the motor.

It is proposed that the cover is arranged between the cutting device and the motor housing of the motor. The cover is provided for receiving and/or fixing a drive shaft side of a motor housing of the motor. The cover forms, as it were, the motor flange for receiving and/or fixing the motor. The motor has a motor housing. The motor housing encloses a stator and rotor of the motor. The motor housing has bearings for supporting a drive shaft. The drive shaft is provided for driving, in particular for directly driving, the cutting device. The drive shaft projects through an aperture in the cover or in the motor flange. The drive shaft drives a tool receptacle or a tool arranged on the tool receptacle. Tool receptacle and tool may form at least parts of the cutting device. The cutting device may for example be formed as a cutter bar, as a rotary disk with at least one blade, as a rotary disk with at least one blade which is rotatable relative to the rotary disk, and/or the like.

The main body encloses the motor radially in relation to the axis of rotation thereof. The main body encloses the motor axially, in relation to the axis of rotation thereof, on one side, in particular averted from the drive shaft side. The main body encloses the motor axially, in relation to the axis of rotation thereof, on the side situated opposite the cover. The main body is designed to be spaced apart from the motor housing. An inner contour of the main body is designed to be spaced apart from the outer contour of the motor, in particular so as to be spaced apart from the motor housing of the motor.

The cover closes the main body, in particular the main body in the form of a pot-shaped housing. A seal is advantageously arranged between cover and main body. The seal may in particular be formed as a static seal, for example by a sealing ring or the like. Aside from a wall which axially closes off the motor and which in particular closes the motor-receiving housing, the cover may also have radial walls. The axial extent thereof is however at least less than the axial extent of the radial wall of the main body, in particular of the housing pot. The radial wall may have a substantially cylindrical, square, rectangular shape and/or a mixture of these and/or any other contour which radially surrounds the motor, for example a free-form contour. The radial wall may also be constructed from multiple wall sections. The radial and axial wall of the main body is advantageously formed as a single piece. The main body advantageously has plastic. In particular, the main body is formed from plastic. In particular, the main body is formed from material which is insulating from a thermal conductivity aspect. The main body may also have an axial wall which is designed to be detachable from the radial wall. Said radial and axial walls are advantageously cohesively connected.

It is proposed that the cover and the main body are formed from materials with different thermal conductivity, wherein, in particular, the cover is formed from a material with increased thermal conductivity, preferably with a thermal conductivity which is several times higher than the thermal conductivity of the main body, wherein, in particular, the main body is formed from a thermally insulating material, in particular thermally insulating plastic.

It is proposed that the cover is provided for dissipating heat in the direction of a standing plane of the lawnmower and/or in the direction of the region of the cutting device, in particular in the direction of an air flow caused by the cutting device, in particular in the direction of an air flow caused by a tool and/or a tool receptacle of the cutting device.

The cover may for example be constructed from a plastic with increased thermal conductivity, a composite material, a metal, in particular at least aluminum-containing metal or the like. The thermal conductivity of the cover or motor flange is preferably in the range of that of aluminum alloys. A heat flow in the motor-receiving housing can thus be diverted. A part of the motor-receiving housing, in particular the cover or motor flange, can thus serve at least as a part of a cooling system. The cover dissipates heat in the direction of the standing plane or in the direction of the tool receptacle, in particular in the direction of an air flow caused by the tool or the tool receptacle. The cover is advantageously in direct contact with air or with an air flow at an underside of the working appliance. The air flow is advantageously caused by the working appliance, in particular a tool receptacle and/or the tool. The main body or the pot-shaped housing is advantageously formed from a material which is at least insulating from a thermal conductivity aspect, for example plastic, in particular a thermally insulating material and/or plastic. By virtue of the fact that the motor-receiving housing or the main body and cover have/has different materials, it is possible on the one hand to provide an insulation action in particular in the region surrounding the main body, and on the other hand to provide heat conduction, in particular through the cover into the surroundings. The cover or motor flange, which is in particular in contact with the air flow caused by the tool receptacle and/or the tool, dissipates heat. The main body or the rest of the motor-receiving housing or the housing pot, which is typically arranged in the interior of the housing of the working appliance, is at least insulating and/or at least has an insulating action. It is advantageous for only the cover or motor flange to be composed of the material with improved thermal conductivity. A targeted dissipation of heat can be achieved, in particular into a region where an optimum heat dissipation by the tool or the tool receptacle in particular can be expected (high air circulation, shaded side of the working appliance, close to the ground and/or in the region of the moist and/or cool grass etc.). Furthermore, a release of heat through the rest of the motor-receiving housing or through the main body can be at least reduced. In this way, little heat is released into the interior of the housing in particular between the upper and the lower housing shell. As it were, insulation is realized by means of the main body. A thermal bridge is provided by the cover or motor flange. In this way, overheating of the further electrical or electronic components, for example of the processing unit, of the battery or the like, which are in particular arranged within the housing, is avoided. An effective dissipation of heat from the motor-receiving housing, in particular of heat caused by the drive unit, is made possible.

It is proposed that the main body has a ventilation opening and/or an opening for receiving a ventilating means, wherein, in particular, this is arranged on that side of the main body which is averted from the cover.

A lawnmower, in particular autonomous lawnmower, is proposed, having at least a chassis, a motor for driving a cutting device, and a height adjustment device for a displacement of the cutting device and of the motor relative to the chassis, at least for setting a working height of the cutting device relative to the chassis, in particular for setting a cutting height of a cutting tool of the cutting device, wherein the height adjustment device has an in particular hollow cylindrical rotary body and a sliding seat in particular surrounding the rotary body, which rotary body and sliding seat have corresponding threads such that a rotation of the rotary body results in a linear displacement of the sliding seat.

It is proposed that at least one of the threads has at least two thread sections, wherein the one thread section, in particular an elastically displaceable thread section, preferably a thread section which is elastically displaceable radially in relation to the thread axis, comprises means which, in relation to the further thread section, increase a thread tooth width of the one thread section and/or reduce a thread turn width of the one thread section and/or cause an offset of a flank and/or an offset of a lead of the one thread section.

It is proposed that the means is at least one thread flank with a different lead and/or with a different flank width, and/or that the means is a flank or surface, in particular thread flank, preferably a thread tooth flank, which, relative to the further thread section, has an axial and/or normal offset in relation to the helical line thereof, and/or that the means is a greater thread tooth width and/or flank width and/or tooth tip width and/or a smaller thread turn width of the one thread section in relation to the thread tooth width or flank width or thread turn width of the further thread section.

It is proposed that the means is a thread tooth with tooth flanks which are displaceable relative to one another, in particular with tooth flanks which are elastically displaceable relative to one another, preferably with tooth flanks which are displaceable relative to one another axially with respect to the thread axis or normally with respect to the helical line of the thread.

It is proposed that at least one of the threads has at least one thread turn with at least two thread turn sections, wherein one thread turn section, in particular an elastically displaceable thread turn section, has a different gradient and/or a different flank width than the further thread turn section, and/or that at least one of the threads has at least two thread sections which adjoin one another in a circumferential direction in relation to the helical line of the thread, wherein a thread flank, in particular a thread flank surface, preferably a thread tooth flank of one relative to the further thread section has an axial offset in relation to the helical line of the thread and/or has an offset normal with respect to the helical line, and/or that a thread tooth width (and/or flank width) of one thread section is greater, and/or a thread turn width (or thread tooth space) of one thread section, is smaller than that of the further thread section.

It is proposed that the means is at least one surface, in particular one sliding surface, in particular one surface with the same action as a tooth flank, which narrows a thread tooth width and/or causes the offset.

It is proposed that at least one of the threads has an elastically displaceable thread section, in particular a thread section which is elastically displaceable radially with respect to the thread axis, wherein the thread section is, by way of a section which extends in a circumferential direction with respect to the thread axis, attached to the one thread or to the rotary body or to the sliding seat.

It is proposed that the section is formed as a circumferential web and/or torsion beam.

It is proposed that the one thread section is received on a radially elastically displaceable lug, in particular on a lug which is attached to the section or circumferential web and/or torsion beam, in particular received on a free end of the lug, preferably received spaced apart from the section, in particular received spaced apart from the section by at least one lead height.

It is proposed that the section and/or the lug are/is fixed to a distal end of the thread, in particular of the rotary body or sliding seat, and in particular, the one thread section is arranged in the region of a distal end of the thread.

It is proposed that, on the sliding seat or rotary body, there are provided multiple elastically displaceable thread sections, preferably two, in particular spaced apart equiangularly about the axis of rotation, wherein, in particular, the elastically displaceable thread sections come to lie in a plane normal to the axis of rotation or thread axis, wherein, in particular, the elastically displaceable thread sections are arranged on different thread turns of the thread which is formed as a multi-turn thread.

It is proposed that one thread section is formed as a single piece with the rotary body or sliding seat and/or the lug and/or the further thread section.

It is proposed that one of the threads is an internal thread or external thread and/or is a multi-turn, in particular a four-turn thread.

It is proposed that a motor-receiving housing, which receives the motor in particular with sealing action, is connected to the sliding seat such that the motor-receiving housing is received within the in particular cylindrical rotary body, in particular within an inner cylindrical lateral surface of the rotary body, in particular so as to be linearly displaceable together with the sliding seat relative to the rotary body or relative to the chassis.

It is proposed that the lawnmower has a guide device which is formed separately from the chassis and which has a guide element which, in relation to a height adjustment axis of the height adjustment device, is designed for at least rotation-inhibiting axial guidance of a sliding seat and for at least axially inhibiting rotational guidance of a rotary body of the height adjustment device.

It is proposed that, between the chassis and a support unit or a sliding seat, for holding and bearing the motor and/or for holding and bearing a motor-receiving housing which receives the motor, there are provided guide means for rotation-inhibiting and axial guidance of the support unit or of the sliding seat relative to the chassis about or in a height adjustment axis direction, wherein the one or more guide means are designed to be elastically displaceable in a circumferential direction about the height adjustment axis, wherein, preferably, the guide means are part of a guide device and/or of at least one guide element.

It is proposed that the guide device has multiple, in particular two, guide elements, in particular guide elements which are situated opposite one another in relation to the height adjustment axis.

It is proposed that the guide device or guide elements are fixedly connectable, in particular connected by screw connection and/or in positively locking fashion, to the chassis.

It is proposed that the guide device is provided for receiving the height adjustment device in spaced-apart fashion and/or with oscillation-decoupling action on the chassis, in particular for receiving the height adjustment device in spaced-apart fashion and/or with oscillation-decoupling, bearing and supporting action on the chassis, preferably for receiving at least the height adjustment device, the motor and the cutting device in spaced-apart fashion and/or with oscillation-decoupling, bearing and supporting action on the chassis.

It is proposed that the guide device or the one or more guide elements has at least one, preferably multiple, elastically displaceable guide means, in particular axially, radially and/or circumferentially elastically displaceable guide means, designed in particular with displacement-inhibiting action in an axial or radial or circumferential direction in relation to a height adjustment axis of the height adjustment device.

It is proposed that the one or more guide means is/are, at least for the rotation-inhibiting axial guidance of the sliding seat, designed to be displaceable in circumferentially elastic fashion, in particular displaceable in circumferentially and radially elastic fashion.

It is proposed that the one or more guide means is/are attached in lug-like fashion to the guide element, in particular is/are attached in circumferentially and radially elastically displaceable fashion to the guide element.

It is proposed that the one or more guide means is/are formed as a guide profile, in particular as a guide rail, in particular as a sliding guide rail.

It is proposed that, on the sliding seat, at least one, preferably multiple, corresponding guide means, which is/are non-elastically displaceable in a circumferential direction and/or in a radial direction relative to the height adjustment axis, in particular corresponding guide means, are provided, in particular guide means formed as a guide profile, in particular as a guide rail, preferably as a sliding guide rail.

It is proposed that the one or more guide means is/are formed as a single piece with the guide element or the sliding seat.

It is proposed that the motor-receiving housing has a cover and at least one main body, in particular a main body in the form of a pot-shaped housing, characterized in that the cover is provided for fixing the motor on the motor-receiving housing. The cover may be arranged between the cutting device and a motor housing of the motor.

It is proposed that the cover is provided for receiving and/or fixing a drive shaft side of a motor housing of the motor.

It is proposed that the cover and the main body are formed from materials with different thermal conductivity, wherein, in particular, the cover is formed from a material with increased thermal conductivity, preferably with a thermal conductivity which is several times higher than the thermal conductivity of the main body, wherein, in particular, the main body is formed from a thermally insulating material, in particular thermally insulating plastic.

It is proposed that the cover is provided for dissipating heat in the direction of a standing plane of the lawnmower and/or in the direction of the region of the cutting device, in particular in the direction of an air flow caused by the cutting device, in particular in the direction of an air flow caused by a tool and/or a tool receptacle of the cutting device.

It is proposed that the main body has a ventilation opening and/or an opening for receiving a ventilating means, wherein, in particular, this is arranged on that side of the main body which is averted from the cover, or on the base of said main body.

Working appliance (10), preferably autonomous working appliance (10), in particular lawnmower (11), preferably autonomous lawnmower (11), having a chassis (45), having a tool receptacle (12), having a drive unit (14) for driving the tool receptacle (12) and having a height adjustment unit (16) which is provided for setting a working height (h), in particular a cutting height (s), of a tool (18) received by the tool receptacle (12), wherein a support unit (100) at least for supporting the drive unit (14) is provided, and the support unit (100) with the drive unit (14) and the tool receptacle (12) are designed to be height-adjustable relative to the chassis (45), in particular height-adjustable in linearly displaceable fashion relative to the chassis (45), characterized in that, between the support unit (100) and the drive unit (14), in particular between the support unit (100) and a motor-receiving housing (36) which receives the drive unit (14), there is/are arranged at least one, preferably multiple, elastic bearing and supporting element(s) (102), in particular for supporting and bearing at least the drive unit (14), preferably the motor-receiving housing (36) which receives the drive unit (14), relative to the support unit (100) with oscillation-decoupling action.

It is proposed that the drive unit (14) and/or the tool receptacle (12) and/or the motor-receiving housing (36) which receives the drive unit (14) are/is, at least during normal operation of the working appliance (10), received and borne on the support unit (100) exclusively via the one or more elastic bearing and supporting elements.

It is proposed that the one or more elastic bearing and supporting elements (102) and/or the drive unit (14) and/or the motor-receiving housing (36), which receives the drive unit (14), and/or the support unit (100) is/are designed to elastically support and bear the drive unit (14) relative to the support unit (100) in an axial direction along the height adjustment axis direction (590) and/or radially with respect thereto and/or in the circumferential direction (25) with respect thereto, preferably in opposite circumferential directions (25) with respect thereto.

Working appliance (10) at least according to any of the preceding claims, characterized in that the one or more elastic bearing and supporting elements is/are one or more damping elements.

It is proposed that the one or more elastic bearing and supporting elements (102) are arranged on a radial outer surface of the drive unit (14) or of a motor housing (33) of a motor (15) and/or of the motor-receiving housing (36) which receives the drive unit (14), in particular between a radial outer surface of the motor-receiving housing (36) and a radial inner surface of the support unit (100).

It is proposed that the one or more elastic bearing and supporting elements (102) and/or one or more receiving devices (134, 135) for the one or more elastic bearing and supporting elements (102) are arranged on the drive unit (14) and/or on the motor-receiving housing (36), which receives the drive unit (14), and/or on the support unit (100) in different planes (126, 128), which are in particular offset in parallel, preferably normally with respect to the height adjustment axis (590), in particular the eight elastic bearing and supporting elements (102) are provided in two planes (126, 128) which are offset in parallel, wherein, in particular, the bearing and supporting elements (102) are arranged at regular intervals and/or angles with respect to one another.

It is proposed that bearing and supporting elements (102) which are adjacent, in particular adjacent in the circumferential direction (25) about a height adjustment axis (590), and/or the receiving devices (134, 135) thereof, are provided for supporting forces in different directions, in particular in opposite circumferential directions (25) about the height adjustment axis (590).

It is proposed that overload protection means (148), in particular positive-locking means (152), for example abutment means (154, 156, 158), preferably corresponding abutment means (154, 156, 158), are provided on the drive unit (14) and/or the motor-receiving housing (36), which receives the drive unit (14), and/or the support unit (100), in particular in order to receive and/or transmit loads which exceed a threshold value, in particular overload protection means (148) for receiving radial, axial or tangential or circumferential forces in relation to the height adjustment axis (590).

It is proposed that the support unit (100) at least partially, preferably completely, radially surrounds the drive unit (14) and/or the motor-receiving housing (36) which receives the drive unit (14), in particular partially, preferably substantially completely along the axial extent of the drive unit (14) and/or of the motor-receiving housing (36).

It is proposed that the motor-receiving housing (36) at least partially, in particular completely, surrounds the drive unit (14), wherein, preferably, the motor-receiving housing (36) is formed as a main body (50) with cover (52), in particular as a pot-shaped housing with cover (52), and the cover (52) forms the flange for the drive unit (14), in particular a motor flange (35), wherein, in particular, the cover (52) is formed from a different material, in particular in terms of thermal conductivity, than the main body (50), in particular a material with higher thermal conductivity, preferably a thermal conductivity which is several times higher than the thermal conductivity of the main body (50), wherein, preferably, the cover (52) is provided for dissipating heat in the direction of the standing plane (56) and/or tool receptacle (12), in particular in the direction of an air flow caused by the tool (18) or the tool receptacle (12).

It is proposed that the height adjustment unit (16) has an in particular hollow cylindrical rotary body (118) and a sliding seat (104) which in particular surrounds the rotary body (118) and which is simultaneously formed as the support unit (100), and the rotary body (118) and the sliding seat (104) have corresponding threads (206, 208) such that a rotation of the rotary body (118) results in a linear displacement of the sliding seat (104), wherein at least one of the threads (206, 208) has at least two thread sections (236, 238), wherein one thread section (236), in particular an elastically displaceable thread section (236), preferably a thread section (236) which is elastically displaceable radially in relation to the thread axis, comprises means which, in relation to the further thread section (238), increase a thread tooth width (b1) of the one thread section (236) and/or reduce a thread turn width of the one thread section (g1) and/or cause an offset (a1) of a flank (242) and/or an offset of a lead (P1) of the one thread section (236).

It is proposed that wherein the height adjustment unit (16) has an in particular hollow cylindrical rotary body (118) and a sliding seat (204) which in particular surrounds the rotary body (118) and which is simultaneously formed the support unit (100), and the rotary body (118) and the sliding seat (204) have corresponding threads (206, 208) such that a rotation of the rotary body (118) results in a linear displacement of the sliding seat (204), wherein at least one of the threads (206, 208) has an elastically displaceable thread section (236), in particular a thread section (236) which is elastically displaceable radially in relation to the thread axis, wherein the one thread section (236) is attached, by means of a section (264) extending in the circumferential direction (25) with respect to the thread axis, to the one thread (206, 208) or the rotary body (118) or the sliding seat (204).

It is proposed that, between the chassis (45) and the support unit (100), for holding and bearing a motor-receiving housing (36) which receives the drive unit (14), there are provided guide means (600) for rotation-inhibiting and axial guidance of the support unit (100) or of the sliding seat (204) relative to the chassis (45) about or in the height adjustment axis direction (590), wherein the one or more guide means (600) are designed to be elastically displaceable in the circumferential direction (25) about the height adjustment axis (590), wherein, preferably, the guide means (590) are part of a guide device (19) and/or of at least one guide element (20).

It is proposed that the working appliance (10) comprises a guide device (19) which is formed separately from the chassis (45) and which has at least one guide element (20) which, in relation to a height adjustment axis (590) of the height adjustment unit (16), is designed for at least rotation-inhibiting axial guidance of the support unit (100), in particular of the sliding seat (204), and for at least axially inhibiting rotational guidance of a rotary body (118), which drives the support unit (100), of the height adjustment unit (16).

BRIEF DESCRIPTION OF THE DRAWINGS

Further advantages will emerge from the following description of the drawing. The drawing illustrates an exemplary embodiment at least of the disclosure in multiple figures. The drawing and the description contain numerous features in combination. A person skilled in the art will expediently also consider the features individually and combine them to form meaningful further combinations.

In the drawing:

FIG. 11 shows a front and rear view of the support unit or of the sliding seat as per FIG. 10.

DETAILED DESCRIPTION

Figure 1:
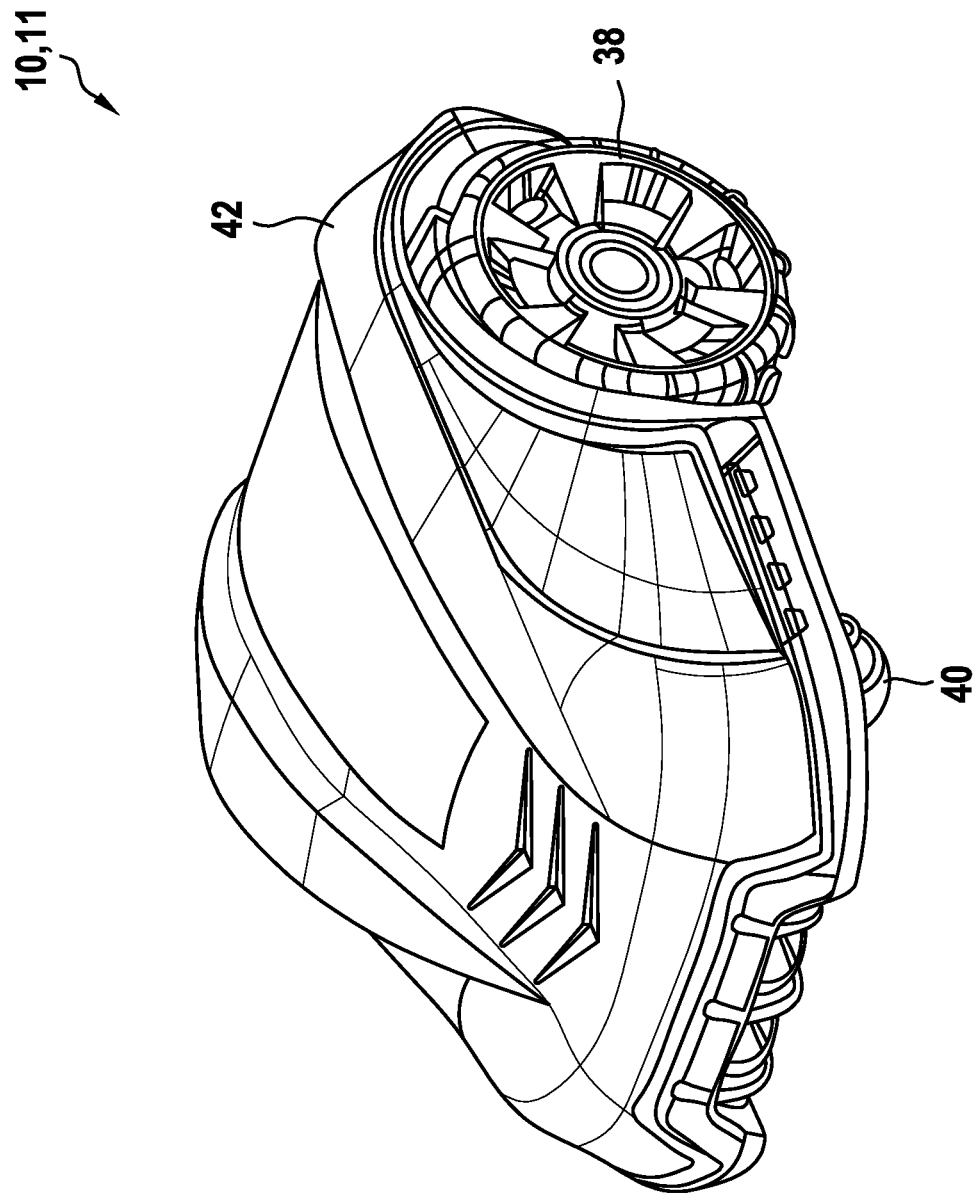
FIG. 1 shows a working appliance in the form of an autonomous working appliance, in particular of an autonomous lawnmower.

FIG. 1 shows a working appliance 10 in a perspective schematic illustration. It is in the form of an autonomous working appliance 10. It is in the form of a lawnmower 11. It is in the form of an autonomous lawnmower 11. The working appliance 10 is provided for performing work on a lawn area. The working appliance 10 is provided for mowing a lawn area. Alternatively, the working appliance, or a working appliance of alternative construction, could be provided or designed for example for scarifying, trimming or the like. It could also be in the form of a push-type lawnmower, which is at least guided manually over a working area, in particular can be at least pushed manually over a working area. It could however also be formed a working appliance which is capable of flying or walking (not illustrated here), with rotors, articulated arms, other propulsion means or the like which are fixed to a chassis 45. It could in principle also be in the form of a cleaning appliance with a tool which is in the form of a cleaning tool and which is received on the tool receptacle, in particular with his drive unit, so as to be height-adjustable relative to the chassis 45. In the exemplary embodiment of FIG. 1, the working appliance 10 is provided for autonomous propulsion. For autonomous propulsion, the working appliance 10 has two separately driven rear wheels 38 and two freely rotatable front wheels 40, wherein only in each case one rear wheel and one front wheel can be seen in FIG. 1 and in the sectional illustration as per FIG. 2. The basic construction of an autonomous lawnmower should be sufficiently well known to a person skilled in the art, for which reason details regarding the wheel drive, the open-loop or closed-loop control, the navigation means and/or the communication means will not be discussed in any more detail here. In principle, the working appliance may also have other propulsion means, for example the abovementioned articulated arms which are fastened to a chassis, for example in order to allow a manner of propulsion based on that of a biped or quadruped. Alternatively, the working appliance could also be designed to hover, for example in the form of a drone. The rear wheels 38 are driven individually by drive units which are not visible in any more detail. Said rear wheels are individually controllable. The working appliance is thus maneuverable. The front wheels 40 are horizontally freely rotatable in order to allow a variation of an orientation. The propulsion of the autonomous working appliance 10 may be controlled in open-loop or closed-loop fashion by an open-loop or closed-loop control unit 13.

Figure 2:
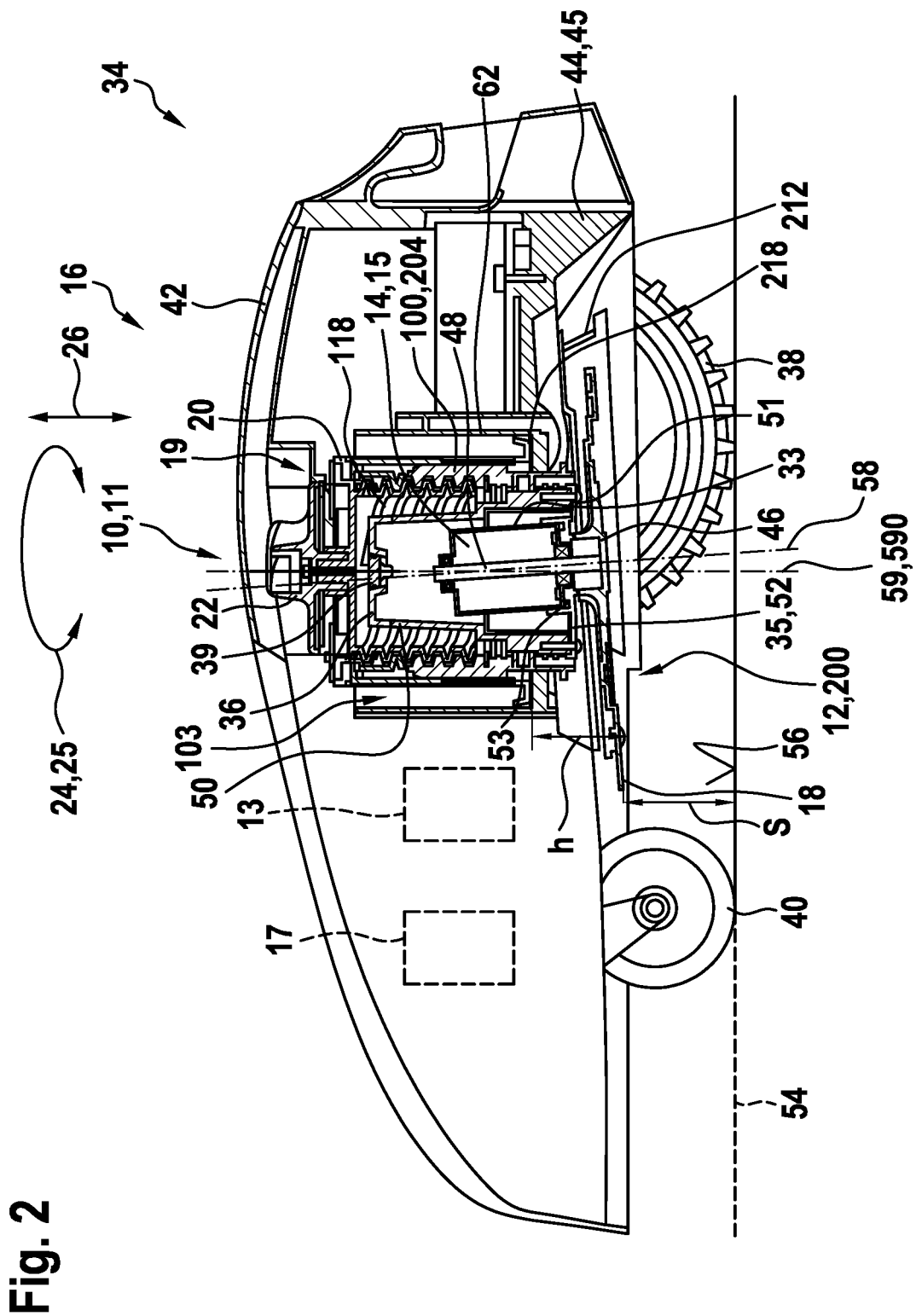
FIG. 2 shows the working appliance in a schematic sectional illustration.
Figure 3:
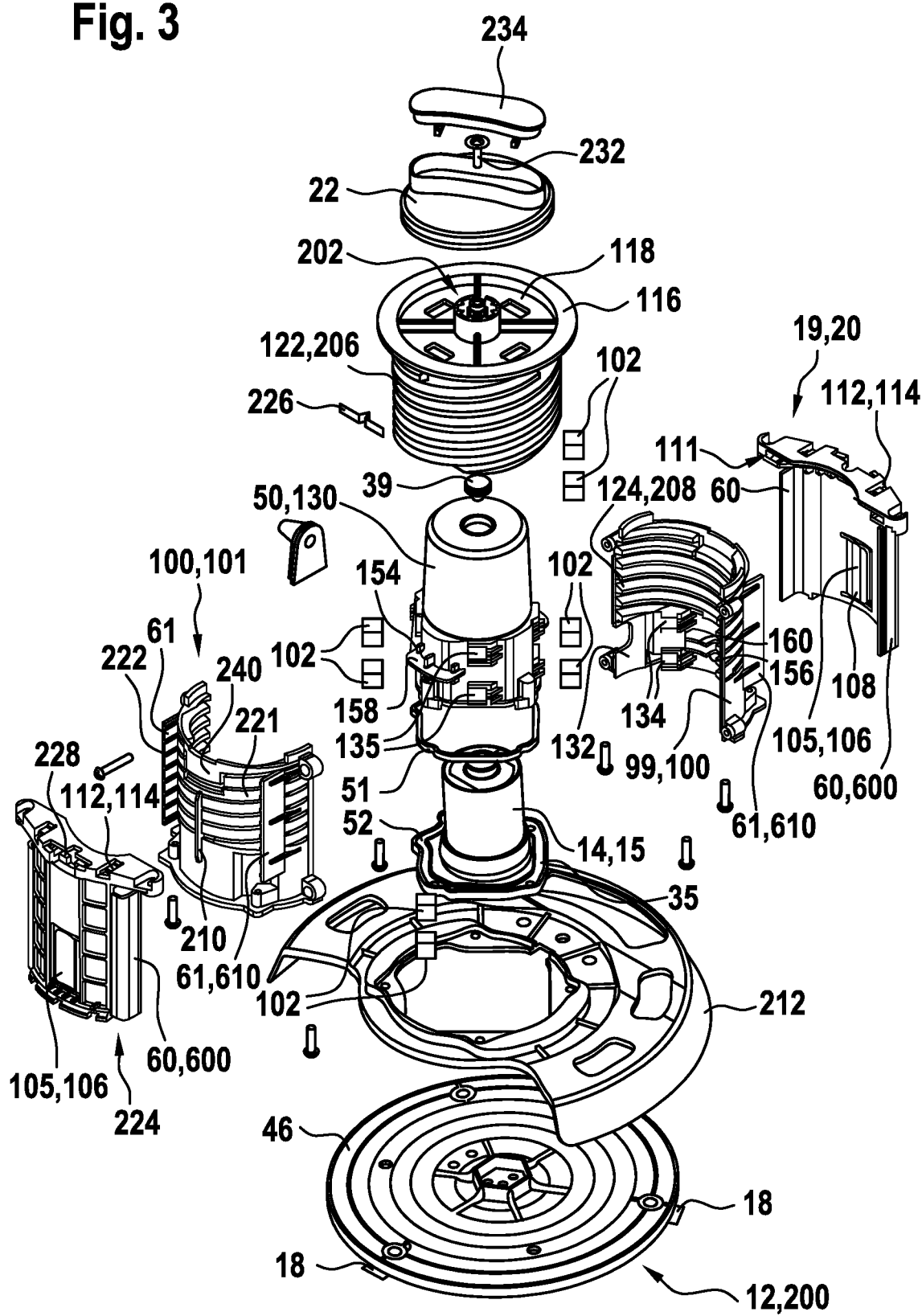
FIG. 3 shows a partial detail of the working appliance in a schematic exploded illustration without chassis or housing.

FIG. 2 shows a schematic section longitudinally through the working appliance 10 or the autonomous lawnmower 11 as per FIG. 1 or a section through a similar working appliance. The autonomous working appliance 10 has a housing 34. The housing 34 is in particular formed by a plastics housing, though may also be formed at least partially from a different material. The housing 34 has an upper housing shell 42 and a lower housing shell 44. The upper housing shell 42 is connected to the lower housing shell 44. The lower housing shell 44 forms the chassis 45 of the working appliance 10. The rear and front wheels 38, 40 are received here on the chassis 45. The working appliance 10 furthermore has a tool receptacle 12. The tool receptacle 12 serves for holding a tool 18. The tool 18 is fastened to the tool receptacle 12. The tool receptacle 12 has a driveable rotary disk 46. The tool 18 is fastened to the rotary disk 46 of the tool receptacle 12. The tool 18 is formed by multiple blades. Here, three blades are provided (only two of which are visible) which are fastened rotatably to the tool receptacle 12 at regular intervals or angles (every 120°). The tool 18 forms a cutting tool. The tool receptacle 12 and the tool 18 form at least parts of a cutting device 200. Some other number of blades, or some other configuration of the cutting device 200, for example in the form of a cutter bar or the like, is self-evidently also conceivable. Furthermore, the working appliance 10 has a drive unit 14. The drive unit 14 is formed by or at least comprises a motor 15. The motor 15 is in the form of an electric motor. The drive unit 14 is provided for driving the tool receptacle 12 or the cutting device 200. The drive unit 14 is provided for driving the tool 18. The drive unit 14 has a drive shaft 48, which is connected rotationally conjointly to the rotary disk 46 of the tool receptacle 12. In principle, it would also be possible for a transmission ratio to be provided between the rotary disk 46 and the drive unit 14, for example by means of a transmission for example in the form of a belt with belt pulleys of different diameters or the like. One belt pulley could be provided on the drive shaft 48, and the other drive pulley could be provided on a separate drive shaft (not illustrated here) for a tool receptacle and/or a tool. The tool 18 is driven via the drive shaft 48 and the rotary disk 46 of the tool receptacle 12. An axis 58 of the motor 15 or of the drive unit 14 or of the drive shaft 48 is inclined with respect to a vertical—in this case the axis 59. The axis 59 is configured to be substantially perpendicular to a standing plane 56 of the autonomous working appliance 10. The axis 59 also forms the height adjustment axis 590 of the height adjustment device or of the height adjustment unit 16. The axis 58 of the drive unit 14 is inclined typically by 0-10°, preferably by 3°, with respect to a normal perpendicular to a standing plane 56 or with respect to the axis 59 of the autonomous working appliance 10. The axis 58 of the drive unit 14 forms an axis of rotation of the tool receptacle 12. A resistance on the tool 18 as it is guided over the grass can be reduced in a known manner by means of the inclination of the axis 58. During operation, in particular during a forward movement of the working appliance 10, cutting can advantageously be performed primarily by way of a leading edge of the tool 18.

A motor-receiving housing 36 is provided for receiving the drive unit 14 or the motor 15. In principle, the motor-receiving housing 36 may merely be formed as a flange receptacle and not sealed off any further. The motor 15 would then simply be fixed by means of its motor housing 33 to the flange plate. Here, the drive unit 14 or the motor 15 is however advantageously at least partially, in particular completely enclosed, in particular at least partially sealingly enclosed, by the motor-receiving housing 36. The motor-receiving housing 36 may have a main body 50, which is in particular in the form of a pot-shaped housing, and a cover 52. The cover 52 is advantageously arranged closer to the standing plane 56 than the main body 50. The cover 52 is arranged adjacent to the tool receptacle 12 and/or between the motor 15 and the tool receptacle 12. The cover 52 is arranged between the cutting device 200 and the motor housing 33 of the motor 15. The cover 52 is arranged adjacent to the standing plane 56, and the main body 50 is arranged so as to be averted from, or above, said cover. The cover 52 forms a receiving region for receiving the drive unit 14. It serves, so to speak, as a motor flange 35 for the motor 15. The motor-receiving housing 36 is closed to one side, in particular toward the standing plane 56, by the cover 52. The cover 52 is connected—in this case screwed—to the main body 50. Furthermore, a seal element 51 or sealing means is provided between the cover 52 and the main body 50, in particular a compression seal or some other sealing means or the like. The drive unit 14 is fixedly connected to the cover 52 or the motor flange. A direct conduction of heat from the motor housing 33 to the cover 52 or motor flange 35 is advantageously made possible. Furthermore, a seal element 53 or sealing means is provided between the cover 52 and the drive unit 14 or the motor 15. By means of the one or more seal elements 51, 53, an ingress of moisture into the motor-receiving housing 36 can be prevented, which serves at least for preventing corrosion, in particular preventing corrosion of motor components. In a base, which is averted from the cover 52, of the main body 50 (that is to say in this case at the top), the main body 50 has a receptacle or an opening for a ventilating means 39 or a ventilation opening. The ventilating means 39 may serve in particular for sealing the motor-receiving housing 36 in air-permeable but at least water-repellent fashion. The motor-receiving housing 36 may serve for receiving a cooling system, and/or form parts thereof. For example, by means of the material selection for the cover 52 and main body 50 as discussed further below, a heat flow can be diverted, and a cooling system can be provided. The motor-receiving housing 36 has, in particular in an upper region of the main body 50, a partially frusto-conical basic shape. It is surrounded by a cylindrical rotary body 118. In the cover 52, there is provided a recess via which the drive shaft 48 is led out of the cover 52 or the motor flange 35 or the motor-receiving housing 36. A bearing 268 for the mounting of the drive shaft 48 may be arranged in a region of the recess of the cover 52. Furthermore, a radial seal 270 may be provided, in particular for at least impeding an ingress of moisture from outside the motor-receiving housing 36 at least through the region of the recess. The tool receptacle 12 is arranged, and connected to the drive shaft 48, on a side of the cover 52 or of the motor-receiving housing 36 which is averted from the main body 50. The cover 52 or motor flange 35 may be formed from a different material, in particular in terms of thermal conductivity, than the main body 50 or the pot-shaped housing of the motor-receiving housing 36. The motor flange 35 is advantageously formed from a material with higher thermal conductivity than the material of the main body 50, for example a plastic with increased thermal conductivity, composite material, metal, in particular aluminum-containing metal and/or the like. Heat in the motor-receiving housing 36 and/or the working appliance 10, in particular caused by the motor 15, can thus be diverted. A part of the motor-receiving housing 36, in particular the cover 52 or motor flange 35, can thus form at least a part of a cooling system. The cover 52 advantageously dissipates heat in the direction of the standing plane 56 or in the direction of the tool receptacle 12, in particular in the direction of an air flow caused by operation of the tool 18 or of the tool receptacle 12. Said air flow serves, so to speak, as a form of cooling air flow for the motor. The cover 52 is in direct contact with air or the air flow at an underside of the working appliance 10. The main body 50 or the pot-shaped housing is advantageously formed from an insulating material at least in terms of thermal conductivity, for example plastic. By virtue of the fact that the motor-receiving housing 36 and the main body 50 and cover 52 has/have different materials, it is possible on the one hand to provide an insulation action and on the other hand to provide a heat-releasing action. The cover 52 or motor flange, which is in particular in contact with the air flow caused by the tool receptacle 12 and/or the tool 18, dissipates heat. The main body 50 or the rest of the motor-receiving housing 36, which is arranged in the interior of the housing 34, is at least insulating and/or at least has an insulating action. It is advantageously possible for only the cover 52 or motor flange 35 to be composed of the material with improved thermal conductivity. In particular, it may be formed from a more stable material than the main body 50, in particular in order that the motor 15 and/or a catching guard 212 or the like can be received securely, in particular in rotationally fixed fashion. In this way, costs can be saved, because not the entire motor-receiving housing 36 or the main body 50 is formed from thermally conductive and/or relatively stable material. A targeted dissipation of heat is made possible, in particular into a region where an optimum heat dissipation in particular by the tool 18 or the tool receptacle 12 can be expected (high air circulation, shaded side of the working appliance, close to the ground and/or in the region of the moist and/or cool grass etc.). Furthermore, a release of heat through the rest of the motor-receiving housing 36 or the main body 50 can be at least reduced. In this way, at least little heat is released into the interior of the housing 34, in particular between the upper and the lower housing shell 42, 44, at least by the motor 15. As it were, insulation is realized by means of the main body 50 of the motor-receiving housing 36. A thermal bridge is provided by the cover 52 or motor flange 35. In particular, in this way, overheating of further electrical or electronic components, for example of the open-loop and closed-loop control unit 13 and/or of a battery 17 for the power supply of the lawnmower 11 or the like, can be avoided. An effective dissipation of heat from the motor-receiving housing 36, in particular of heat caused by the drive unit 14, is made possible. A high efficiency of the motor 15 by means of effective cooling can be achieved.

Furthermore, the autonomous working appliance 10 has a height adjustment unit or height adjustment device 16. The height adjustment unit 16 is provided at least for setting a working height h or cutting height s of the cutting device 200 or of the tool 18 received by the tool receptacle 12. Said height adjustment unit is furthermore provided for the height adjustment of the drive unit 14 or of the motor 15, in particular of the motor-receiving housing 36 which receives the drive unit 14. Said height adjustment unit comprises a rotary body 118 and a sliding seat 204, which have a threaded connection to one another (see the description further below). The rotary body 118 and the sliding seat 204 are guided by a guide device 19, in particular comprising guide elements 19 which axially inhibit the rotary body 118 and rotationally inhibit the sliding seat 204. The sliding seat 204 forms a support unit 100 or support device for supporting the drive unit 14 or the motor-receiving housing 36. Said sliding seat is connected via bearing and supporting elements 102 to the motor-receiving housing 36. The support unit 100 could in principle also be connected directly to the motor 15 or to the motor-receiving housing 36. The height adjustment device 16 could also, with regard to the height adjustment mechanism, be configured differently (in particular without a rotary body), for example in accordance with the figures, in particular FIGS. 2-5, of EP3167703. It would however advantageously be necessary to additionally provide a support unit and/or guide unit and one or more bearing and supporting elements in order to decouple the drive unit or the motor-receiving housing and/or the tool receptacle from the support unit or the chassis.

Figure 7:
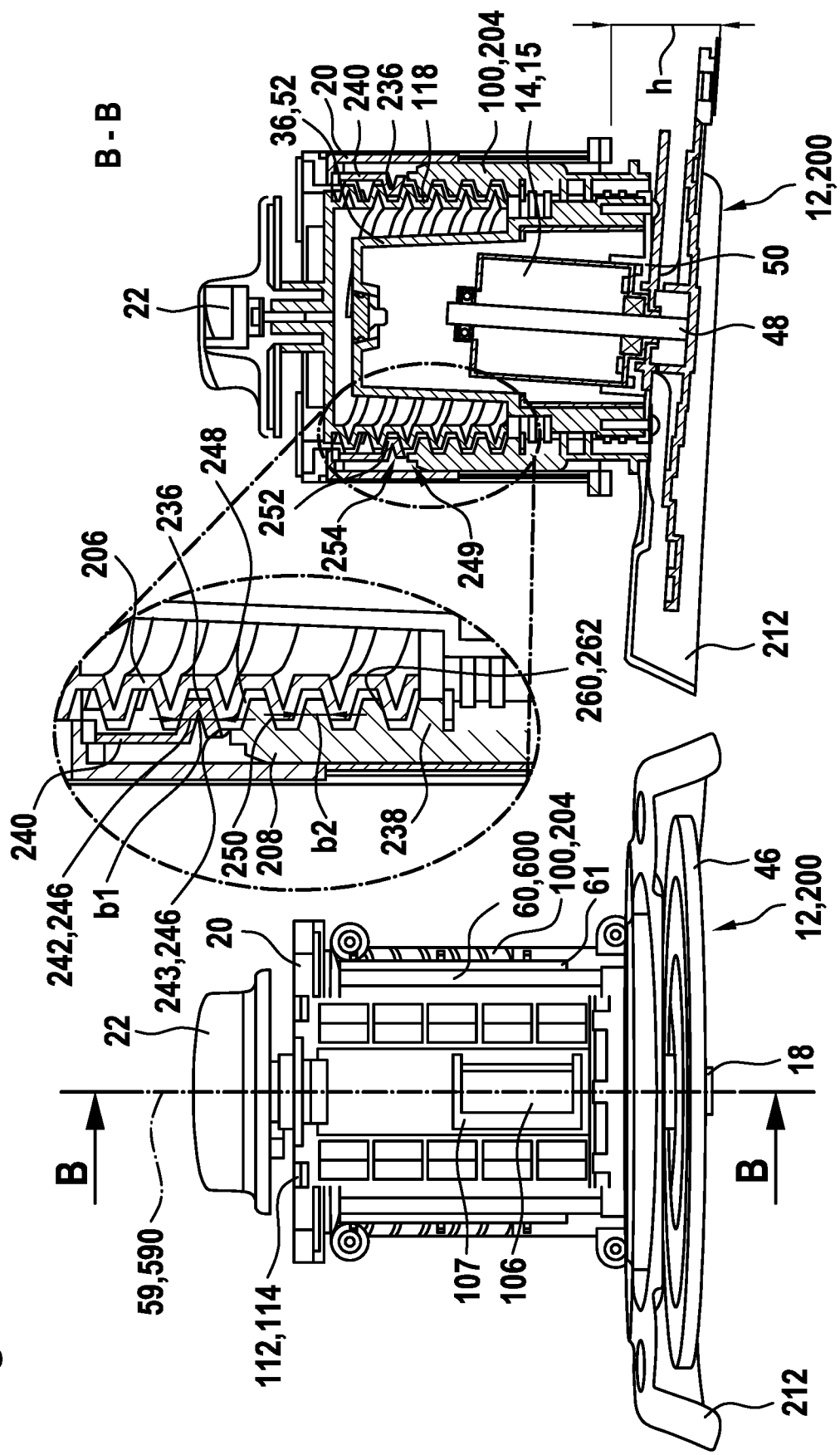
FIG. 7 shows a frontal view of the partial detail and a sectional illustration through the section plane B-B in a first configuration or working height setting.
Figure 8:
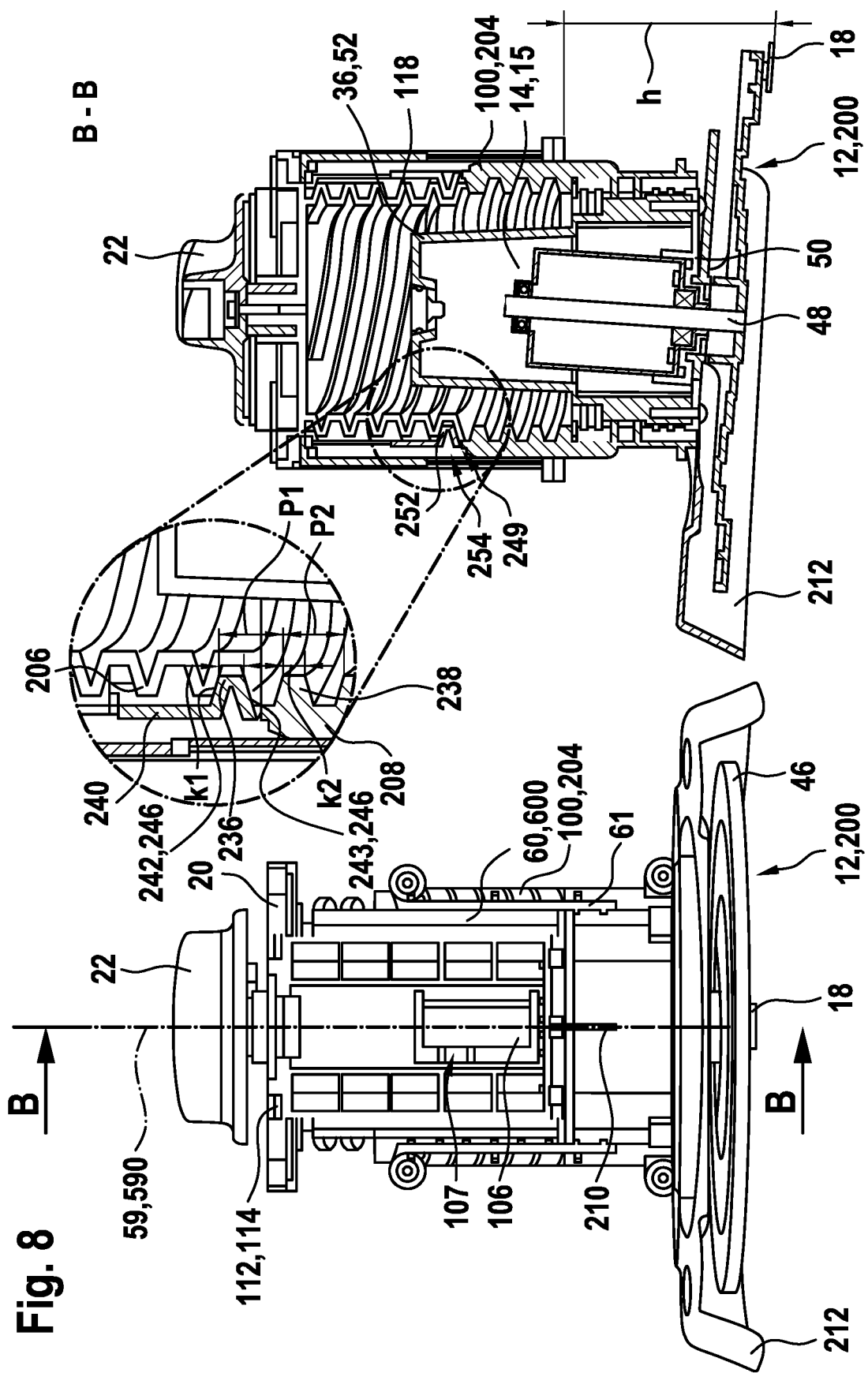
FIG. 8 shows a frontal view of the partial detail and a sectional illustration through the section plane B-B in a second configuration or working height setting.

The height adjustment device 16 is received on a receptacle 103 of the chassis 45 (see further below). Fixed to the motor-receiving housing 36 is a protective device, in particular a catching guard 212, for catching parts of the components, and/or of components fixed to the tool receptacle, which become detached and/or cut material or the like. Said protective device/catching guard is designed to be height-adjustable together with the motor-receiving housing 36. A working height h of the tool 18 is defined as a working height relative to the chassis 45 or to a component, fixedly connected to said chassis, of the height adjustment device 16. A cutting height s of the working appliance 10 or of the tool 18 is defined relative to the standing plane 56. By means of the height adjustment unit 16, an operator can set a desired working height h. Alternatively, it would also be possible for the working height h to be adjusted automatically, for example by a motor device. The height adjustment unit 16 is provided for tool-free setting of the working height h or cutting height of the tool 18 relative to the chassis 45 or relative to the underlying surface or to the standing plane 56. The cutting height s is in this case defined preferably by the spacing a plane which runs parallel to the standing plane 56 of the autonomous working appliance 10 and in which a lowest point of the tool 18 lies. The working height h can be adjusted in steps, though could in principle also be adjusted in continuously variable fashion. FIGS. 7 and 8 show different working or cutting heights h, s of the working appliance 10 or lawnmower 11, or different states of the height adjustment unit 16. The cutting height s in FIG. 7 is, by way of example, set to a maximum, that is to say the spacing from the standing plane 56 to the tool 18 is at a maximum. In FIG. 8, the cutting height s is, by way of example, set to a minimum, that is to say the spacing from the standing plane 56 to the tool 18 is at a minimum. The reverse applies to the working height h or the spacings from the chassis 45.

The height adjustment unit 16 comprises multiple components. In the exemplary embodiment shown, the height adjustment unit 16 comprises at least an actuating element 22, a rotary body 118 and a sliding seat 204. A guide device 19 guides the rotary body and the sliding seat 204 relative to the chassis 45. The actuating element 22 is provided for being moved in an actuating direction 24. The actuating element 22 is provided for being rotated about the height adjustment axis 590. The actuating element 22 is connected to the rotary body 118. The actuating element 22 is connected rotationally rigidly to the rotary body 118 by means of a spline toothing 202. It would also be possible for a transmission ratio to be provided between the rotary body 118 and the actuating element 22, wherein, in particular, an alternative actuating element could be arranged eccentrically with respect to the height adjustment axis 590. The rotary body 118 is formed as a hollow cylindrical rotary body 118. The rotary body 118 is at least partially radially surrounded by a sliding seat 204. The rotary body 118 and the sliding seat 204 have corresponding threads 206, 208, such that a rotation of the rotary body 118 results in a linear displacement of the sliding seat 204. The rotary body 118 has an external thread, and the sliding seat 204 has a corresponding internal thread. The motor-receiving housing 36 is displaceable within the hollow cylindrical rotary body 118. The sliding seat 204 is formed as a support unit 100 for the motor-receiving housing 36. The sliding seat 204 is designed to be axially or linearly displaceable along the axis 59. Said sliding seat is received with rotation-inhibiting action in the chassis 45 by means of the guide device 19, in particular so as to be inhibited in terms of rotation about the axis 59. The guide device 19 is fixedly connected to the chassis 45. The guide device 19 is fixed to the receptacle 103 or to a guide receptacle chamber 62 of the chassis 45.

Figure 9:
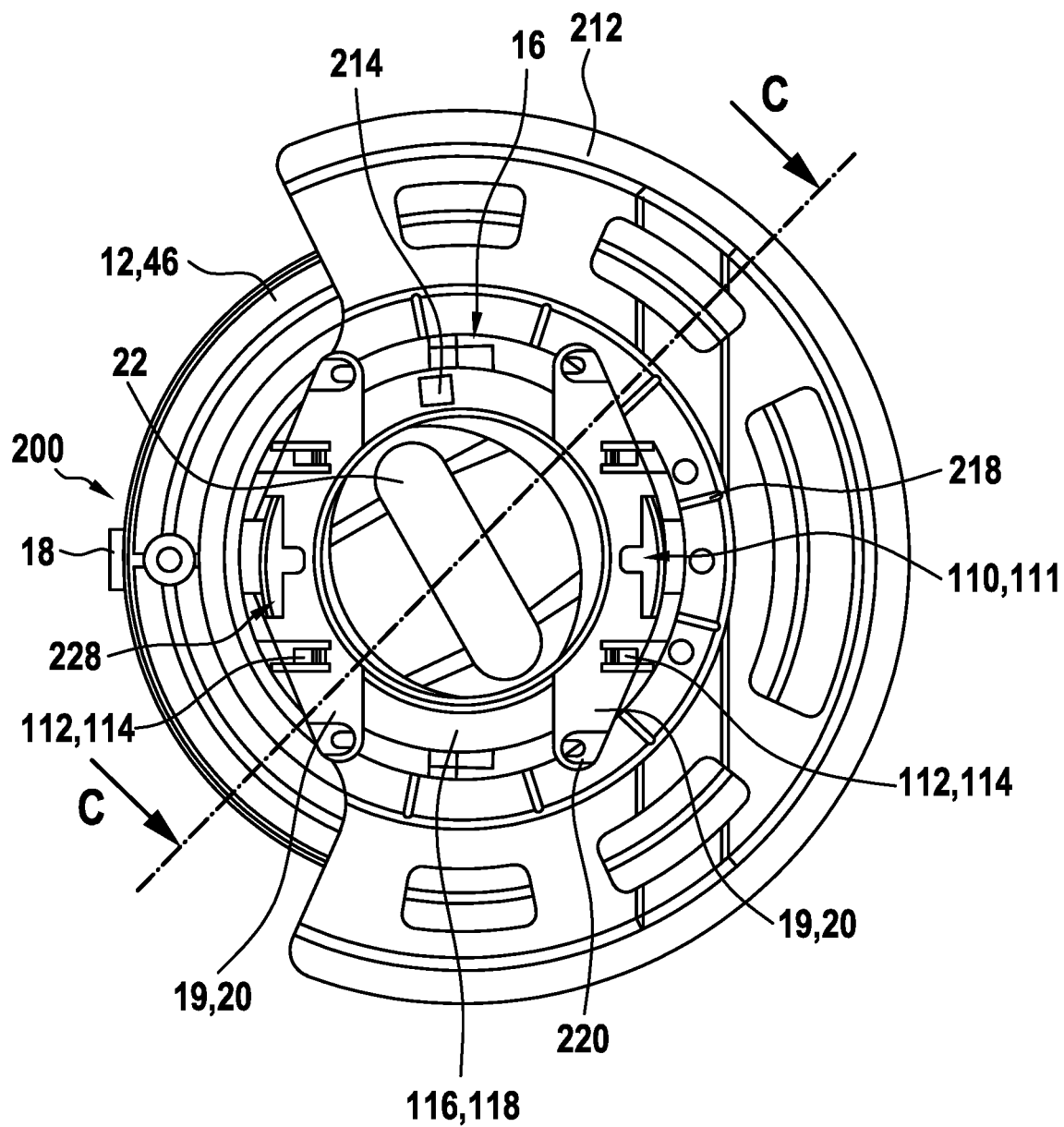
FIG. 9 shows a plan view of the partial detail and a reference to the section plane C-C as per FIG. 4.

The rotary body 118 and the sliding seat 204 or the support unit 100 have corresponding threads 206, 208 or thread sections 122, 124. Multi-turn threads 206, 208 are provided. In the present exemplary embodiment, the thread 206, 208 has four turns. It is thus advantageously possible for a stroke of the sliding seat 204 per rotation to be quadrupled in relation to a single-turn thread. In particular, by means of one rotation of the actuating element 22 or of the rotary body 118, the working height h can be adjusted between a maximum value (cf. FIG. 8) and a minimum value (cf. FIG. 7). Consequently, with a relatively small rotational actuation of the actuating element 22, or a rotation of the rotary body 118, a relatively large stroke of the support unit 100 or of the sliding seat 204 can be attained. With a rotation of the rotary body 118 through less than 360°, it is advantageously possible for the working height h to be adjusted between the maximum value and the minimum value. In the present case, this corresponds to a cutting height s between 20 and 60 mm. The cutting height s can be indicated to a user by a display means 214 (cf. FIG. 9). For this purpose, corresponding numerals are applied in the rotary body 118 or in a ring section 116 of the rotary body 118, which numerals can be read off through a viewing window which is not illustrated here. The threads 206, 208 or thread sections 122, 124 are in the form of trapezoidal threads. The threads 206, 208 or the thread sections 122, 124 are of at least partially self-locking form. An unintended lowering of the support unit 100 within the chassis 45 can thus be at least partially avoided.

The rotary body 118 is received, so as to be inhibited in terms of axial displacement, axially in the direction of the axis 59. Said rotary body is received, so as to be rotatable in the circumferential direction and inhibited in terms of displacement axially, by the guide device 19 or the guide elements 20. The support unit 100 is received so as to be inhibited in terms of rotation but longitudinally displaceable. Said support unit is guided and/or received, so as to be axially displaceable and inhibited in terms of rotation in the circumferential direction, by the guide device 19 or the guide elements 20. A rotation of the rotary body 118 causes a linear displacement of the support unit 100, in particular a lowering or raising of the support unit 100. With the support unit 100, the motor-receiving housing 36 connected thereto, or the drive unit 36 and cutting device 200, is/are also raised and lowered. The guide device 19, in particular owing to its physical configuration, decouples the height adjustment device 16, but in particular the support unit and/or the drive unit 14 and cutting device 200 connected thereto, at least partially from the chassis 45. The height adjustment unit 16 is received in a receptacle 103 of the chassis 45. The receptacle 103 is in this case formed as a single piece with the chassis 45. The receptacle 103 forms a guide receptacle chamber 62, or surrounds this. The guide receptacle chamber 62 extends from an underside of the working appliance 10 in the direction of a top side of the working appliance 10. The guide receptacle chamber 62 extends normally or perpendicularly with respect to the standing plane 56 of the working appliance 10. Said guide receptacle chamber extends along the axis 59. The guide receptacle chamber 62 is open at least toward the underside of the chassis 45. The guide receptacle chamber 62 is provided at least for receiving the guide device 19. The guide device 19 has or receives guide elements 20. Two guide elements 20 are provided which are arranged opposite one another. They are positioned opposite one another in relation to the axis 59. They extend in the direction of the axis 59. Furthermore, they surround the drive unit 14, the motor-receiving housing 36, the rotary body 118 and/or the sliding seat 204 radially, in particular over an angle range of greater than 45°, in this case between 45° and 180°. The two guide elements 20 are, for this purpose, provided for being received fixedly at the guide receptacle chamber 62. In the lower region close to the standing plane 56, by means of positive-locking elements 218, and in the upper region, by means of screw connections, of which only the screw holes 220 can be seen here. Other forms of connection are likewise possible. The guide elements 20 have guide means 600, in particular guide profiles 60. These serve for the linear guidance or the in particular rotation-inhibiting axial guidance of the sliding seat 204 or of the support unit 100. The linear guidance is performed in the direction of the axis 59. Furthermore, the guide profiles 60 substantially prevent a rotation of the support unit 100 about the axis 59, they inhibit a rotation but allow this in a small range, for example of a few degrees or tenths of one degree. For this purpose, the guide profiles 60 are of at least limitedly elastic form. The guide profiles 60 are designed to be elastically displaceable in the circumferential direction about the axis 59. Said guide profiles have a rotation-inhibiting action on the support unit 100 or the sliding seat 204. Said guide profiles have a damping action. It is thus possible for rotational forces of the support unit 100 to be transmitted in dampened fashion to the guide device 19 and ultimately to the chassis 45. The guide profiles 60 engage in corresponding guide profiles 61 or guide grooves of the support unit 100. The guide profiles 60, 61 are advantageously formed relative to one another such that, between them, contact is ensured and/or at least low preload prevails. For example, an external spacing of the walls of the guide profile 60 may be minimally greater than an internal spacing of the corresponding guide profile 61. By virtue of the support unit 100 being brought radially closer to the guide device 19, spreading of the guide profiles 60 can occur, in particular by means of the partially cylindrical lateral surface 221 of the support unit 100 (cf. in particular FIGS. 3 and 10). The guide profiles 61 of the sliding seat 204 or of the support unit are advantageously substantially not of circumferentially elastic form, but rather are of at least substantially circumferentially rigid form. They advantageously have sliding means, in particular multiple protruding sliding projections 222.

Alternatives to the generation of a preload between the guide profiles 60, 61 of the support unit 100 and of the guide device 19 are also conceivable. In this way, a play between the components can be avoided. A generation and/or transmission of noise is at least reduced or dampened by means of the at least circumferentially elastic form of the guide means 600 or guide profiles. The corresponding guide profiles 60, 61 are bodies, in particular surfaces, preferably sliding bodies or surfaces, which are designed to be substantially parallel with respect to one another, in particular oriented parallel to one another. They overlap radially. The two guide profiles 60 on a guide element 20 are oriented substantially parallel to one another. They are of circumferentially elastic and radially elastic form on the guide element 20. They are attached in lug-like fashion to the guide element. They are advantageously attached via an angle 224, which is bent through 90°, close to the transition region to the rest of the guide element 20. At least one of the guide elements 20 is furthermore provided for receiving a detent means, in particular a detent spring 226 (cf. FIG. 3) in a detent means receptacle 228.

The detent means is provided for engaging into detent depressions 230 (not visible in any more detail in FIG. 4) which are arranged on the circumferential surface of the rotary body 118, in particular of the rotary seat 110. In this way, a segmented rotation, or a rotation with defined detent action, of the rotary body 118 or of the height adjustment device 16 can be provided. They furthermore serve for inhibiting the rotation of the rotary body 118.

Between the chassis 45 and the motor housing 33 of the motor 15, in particular between the chassis 45 and the motor-receiving housing 36, preferably between the chassis 45 and the support unit 100 or the sliding seat 204, for holding and bearing the motor 15 and/or the motor-receiving housing 36, there are provided guide means 600 for the rotation-inhibiting and axial guidance at least of the motor-receiving housing 36, in particular of the motor-receiving housing 36, preferably of the support unit 100 or of the sliding seat 204, relative to the chassis 45, about or in the height adjustment axis direction 26, wherein the one or more guide means 600 are designed to be elastically displaceable in the circumferential direction about the height adjustment axis 590. The guide means 600 are designed to be elastically displaceable transversely, in particular radially, with respect to the height adjustment axis 590. Said guide means have a circumferentially elastic but rotation-inhibiting action. They allow axial sliding with low friction parallel to the height adjustment axis 590. They have a damping action with regard to the transmission of vibration and/or noise. The guide means 600 are a constituent part of the guide device 19 or of the guide elements 20. They are formed in particular as guide profiles 60 and/or sliding surfaces and/or guide rail, in particular sliding guide rail. The guide means 600 are of lug-like form and/or are attached in lug-like fashion to the guide device 19 or the guide elements 20, in particular are formed as a single piece with the guide elements 20. On the motor housing, motor-receiving housing (in each case not provided here) or sliding seat 204, there are provided at least one, preferably multiple, corresponding guide means 610 which are in particular non-elastically displaceable in the circumferential direction and/or in the radial direction relative to the height adjustment axis 590, in particular corresponding guide profiles 61.

The guide elements 20 furthermore have radially elastic positive-locking elements 105. These are formed as a lug 106. They or the lug 106 are/is attached, parallel to the direction of the axis 59, to the guide element 20. They or the lug 106 are/is formed as a single piece with the respective guide element 20. They or the lug 106 are/is attached at one of four sides, in particular so as to be pivotable about the attachment region. At the three further sides, the lug 106 is separated or set free from the rest of the guide element 20 by recesses or grooves 107. The lug 106 is provided so as to be elastically displaceable at least in the radial direction in relation to the axis 59. The lug 106 is provided for positioning the support unit 100 in a play-free manner relative to the guide device 19 or the guide element 20 and/or at least radially centering said support unit—in particular even in the presence of relatively high loads. The lug 106 serves for elastically supporting the support unit 100, in particular radially with respect to the axis 59. The radially elastic positive-locking elements 105 can accommodate overload forces and/or dampen vibrations. They can serve for realizing the defined spacing of at least a part of the guide element 20 from the support unit 100. In particular of a base of the guide element, which is connected to the chassis 45. The radially elastic positive-locking element 105 or the lug 106 can serve for vibration damping. The lug 106 may have an axial extent in the direction of the axis 59 which corresponds at least to a maximum displaceability or to the extent of the height adjustability. The support unit 100 may have a projection 210 (cf. FIG. 3, 5, 10 or 11) which is provided for abutting or bearing against the lug 106. For this purpose, the lug 106 has a groove 108 which extends in a direction of the axis 59.

The groove 108 is designed to be concave toward the axis 59. In this way, centering of the support unit 100 in particular in the radial and/or circumferential direction about the axis 59 is at least partially made possible.

Figure 12:
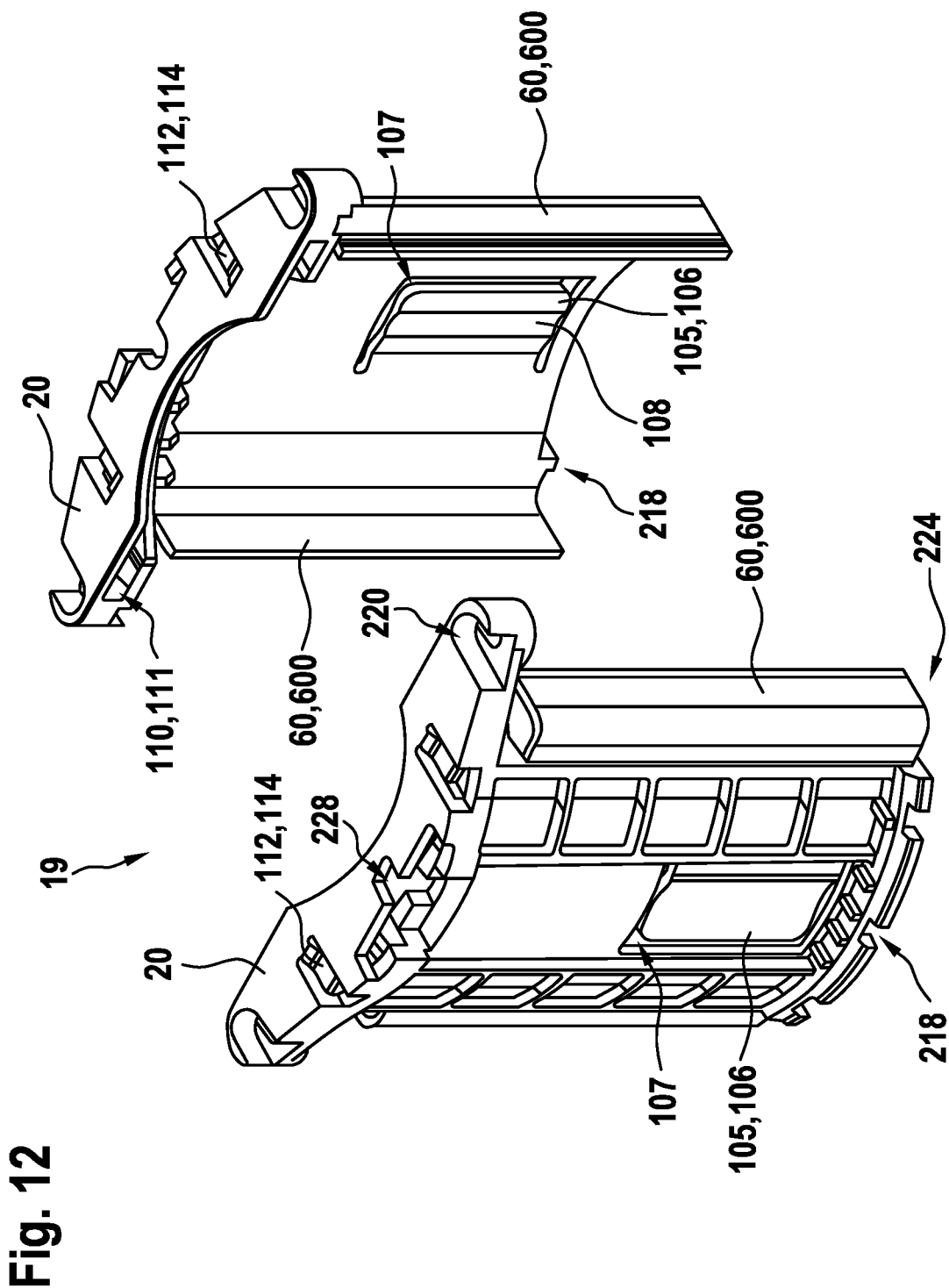
FIG. 12 is a perspective individual illustration of a guide device.

The guide device 19 may furthermore be provided for the in particular elastically axially inhibiting rotational guidance of the rotary body 118 of the height adjustment device 16, in particular for the elastically axially inhibiting rotational guidance of a rotary body 118 which drives the sliding seat 204. In the upper region, the guide elements 20 have a rotary seat 110. The rotary seat 110 is formed as a circular groove 111. The circular groove 111 extends in the radial and circumferential directions in relation also the axis 59. The rotary seat 110 has elastic axial positive-locking elements 112, in particular preloaded lugs 114. The lugs 114 are elastically displaceable in the direction of the axis 59. They are provided for positioning a ring section 116 of the rotary body in a play-free manner. They are nevertheless provided for allowing a rotation of the ring section 116 in the rotary seat 110. They serve for damping vibrations and/or preventing noise emissions. The ring section 116 is in particular formed as a single piece with the rotary body 118. The rotary body 118, in particular the ring section 116 of the rotary body 118, is provided for rotating preferably with low friction in the rotary seat 110. The rotary body 118 rotates in particular in sliding fashion. A play of the rotary body in the direction of the axis 59 is preferably reduced at least by the elastic axial positive-locking elements 112 or lugs 114. It could also be stated that the elastic receiving of the rotary body 118 is provided by means of axially elastically displaceable guide means 216, in particular formed as elastic axial positive-locking elements 112, in particular lugs 114 or the like (cf. in particular FIGS. 9 and 12).

The rotary body 118 has a substantially hollow cylindrical section. This at least partially surrounds the motor-receiving housing 36. It extends perpendicular to the standing plane 56 and is at least substantially closed towards the actuating elements 22. It has, as it were, a pot-shaped form. It is open toward the side of the standing plane 56. It has the thread 206 or the thread sections 122. These are arranged on a lateral surface of the rotary body 118, in particular the outer lateral surface, as an external thread, as it were. The rotary body 118 is provided for being rotated about the axis 59. This may be performed by motor means or manually. In the exemplary embodiment shown, the actuating element 22 is provided for this purpose. The actuating element 22 can be actuated in an actuating direction 24—in this case rotated in the circumferential direction. The actuating element 22 is detachably connected to the rotary body 118, in this case by means of a spline toothing 202. A screw 232 serves for axially securing the actuating element 22 relative to the rotary body 118. A covering means 234 at least for covering the screw 232.

The support unit 100 or the sliding seat 204 has the thread 208 or the thread sections 124. These are formed as internal threads. The thread sections 124 of the support unit 100 are provided for threaded connection to the thread sections 122 of the rotary body 118. The rotary body 118 is provided such that, when rotated, it drives a movement of the support unit 100. The support unit 100 is axially displaced in the event of a rotation of the rotary body 118. The support unit 100 can thus be axially displaced in the direction of the axis 59 or of the height adjustment axis 590. Rotation of the rotary body 118 results in a linear displacement of the sliding seat 204.

The support unit 100 or the sliding seat 204 is constructed from two half-shells 99, 101, though could also be of some other construction. The support unit 100 is provided for supporting the drive unit 14, in particular for supporting the motor-receiving housing 36 which receives the drive unit 14. The support unit 100 is height-adjustable together with the drive unit 14 and the tool receptacle 12. The support unit 100 is in particular designed to be height-adjustable in linearly displaceable fashion relative to the chassis 45. At least one, preferably multiple, elastic bearing and supporting elements 102 are arranged between the support unit 100 and the drive unit 14, in particular between the support unit 100 and the motor-receiving housing 36 which receives the drive unit 14. Said bearing and supporting elements are provided for supporting and bearing the drive unit 14 relative to the support unit 100 with oscillation-decoupling action. Bearing is to be understood to mean that support is realized in all three spatial directions by means of the bearing and supporting elements 102—that is to say radially, axially and in the circumferential direction. The bearing and supporting elements 102 are in particular provided for supporting and bearing the motor-receiving housing 36, which receives the drive unit 14, relative to the support unit 100 with oscillation-decoupling action, in particular in order to generate (cf. in particular FIGS. 3, 4 and 5) or improve a vibration decoupling action in the transmission path to the chassis 45. The drive unit 14, or the motor-receiving housing 36 which receives the drive unit 14, and the tool receptacle 12 are, at least during normal operation of the working appliance 10, supported and borne or received exclusively via the bearing and supporting elements 102. They are supported relative to the chassis 45. They are supported relative to the support unit 100 which is height-adjustable relative to the chassis 45. They are supported with oscillation-decoupling action relative to other components of the height adjustment unit 16, in particular the rotary body 118 and/or the guide device 19.

Figure 4:
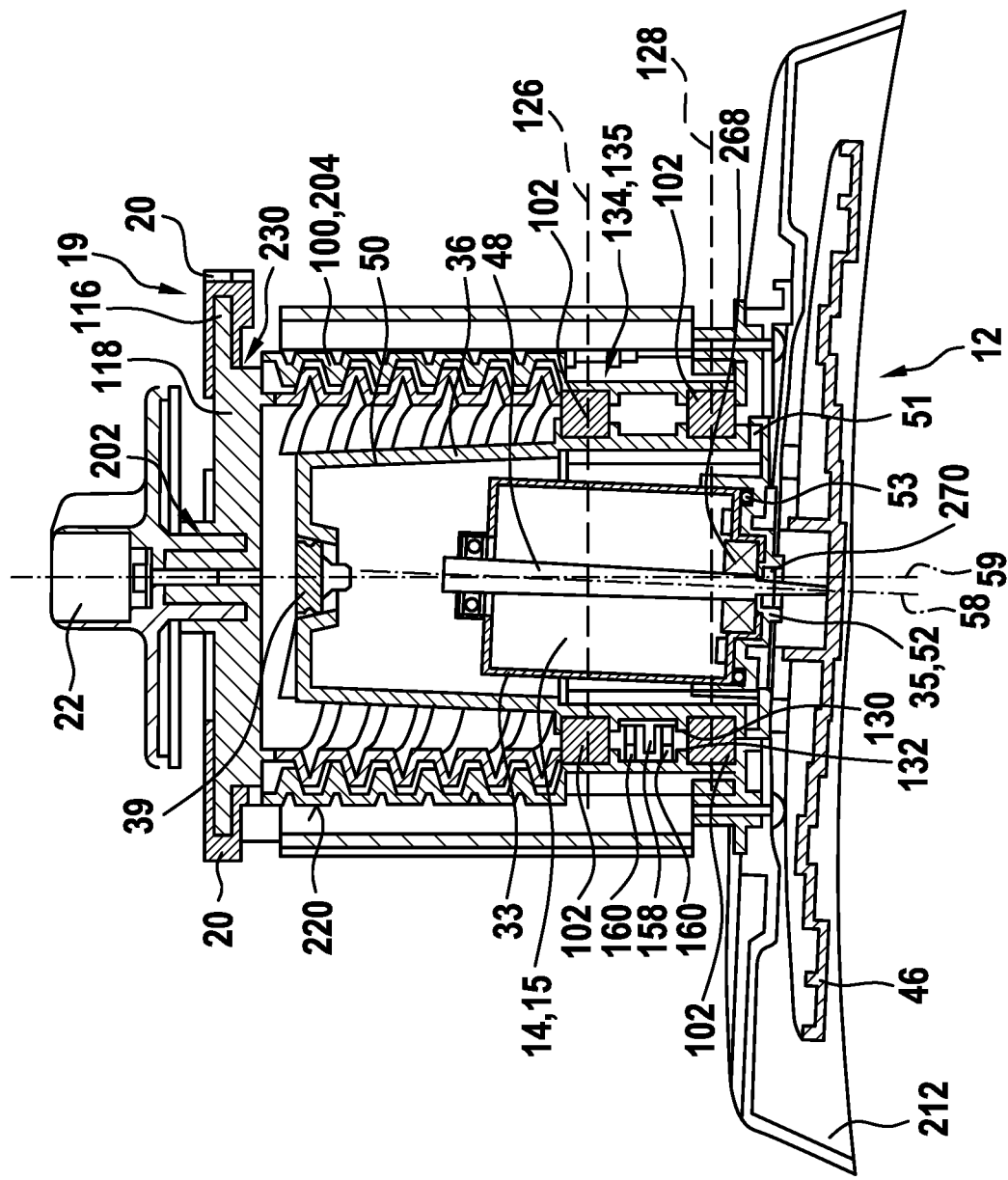
FIG. 4 shows a section through the partial detail in a section plane C-C as per FIG. 9.
Figure 5:
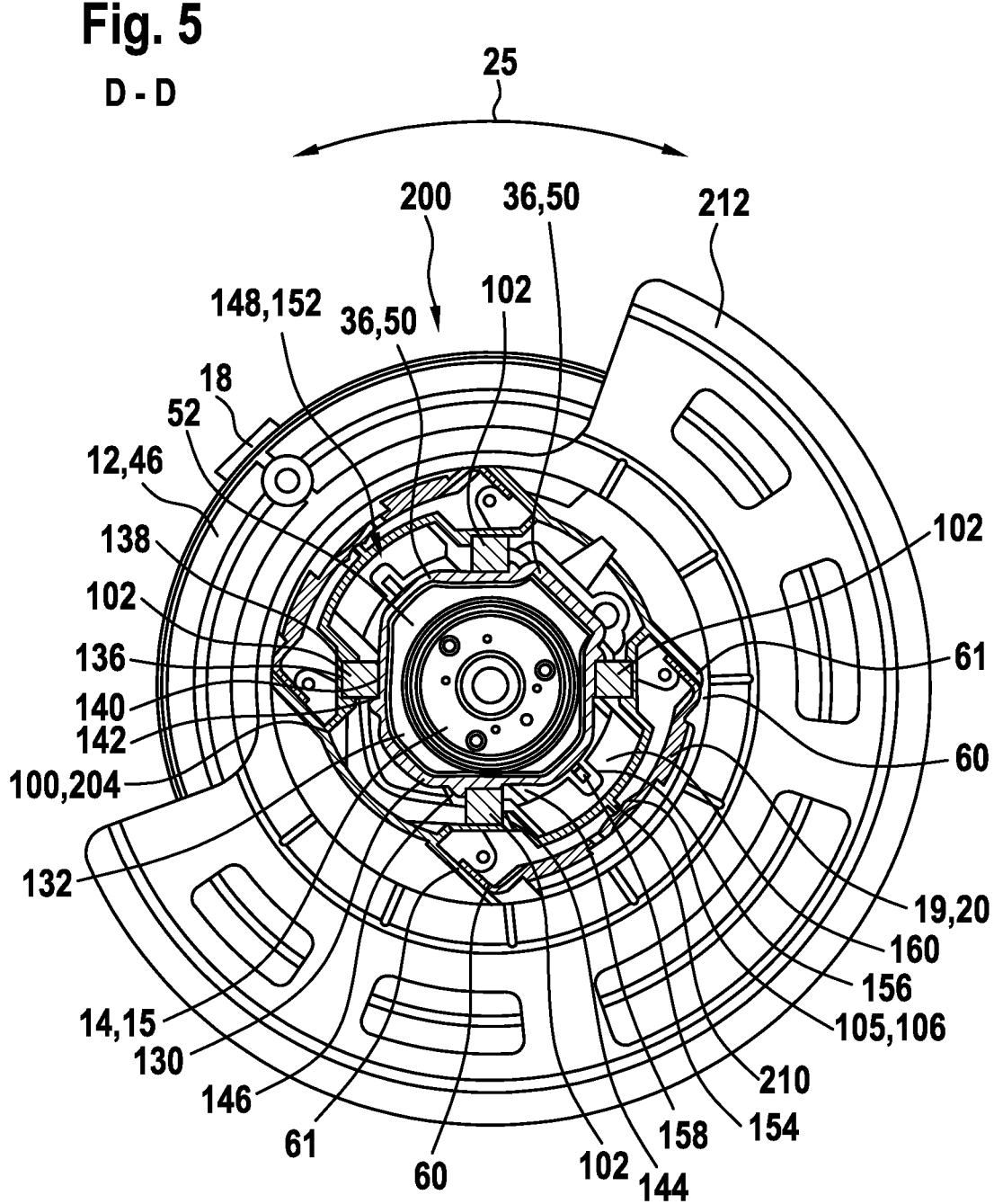
FIG. 5 shows a section through the partial detail in a section plane D-D as per FIG. 6.
Figure 6:
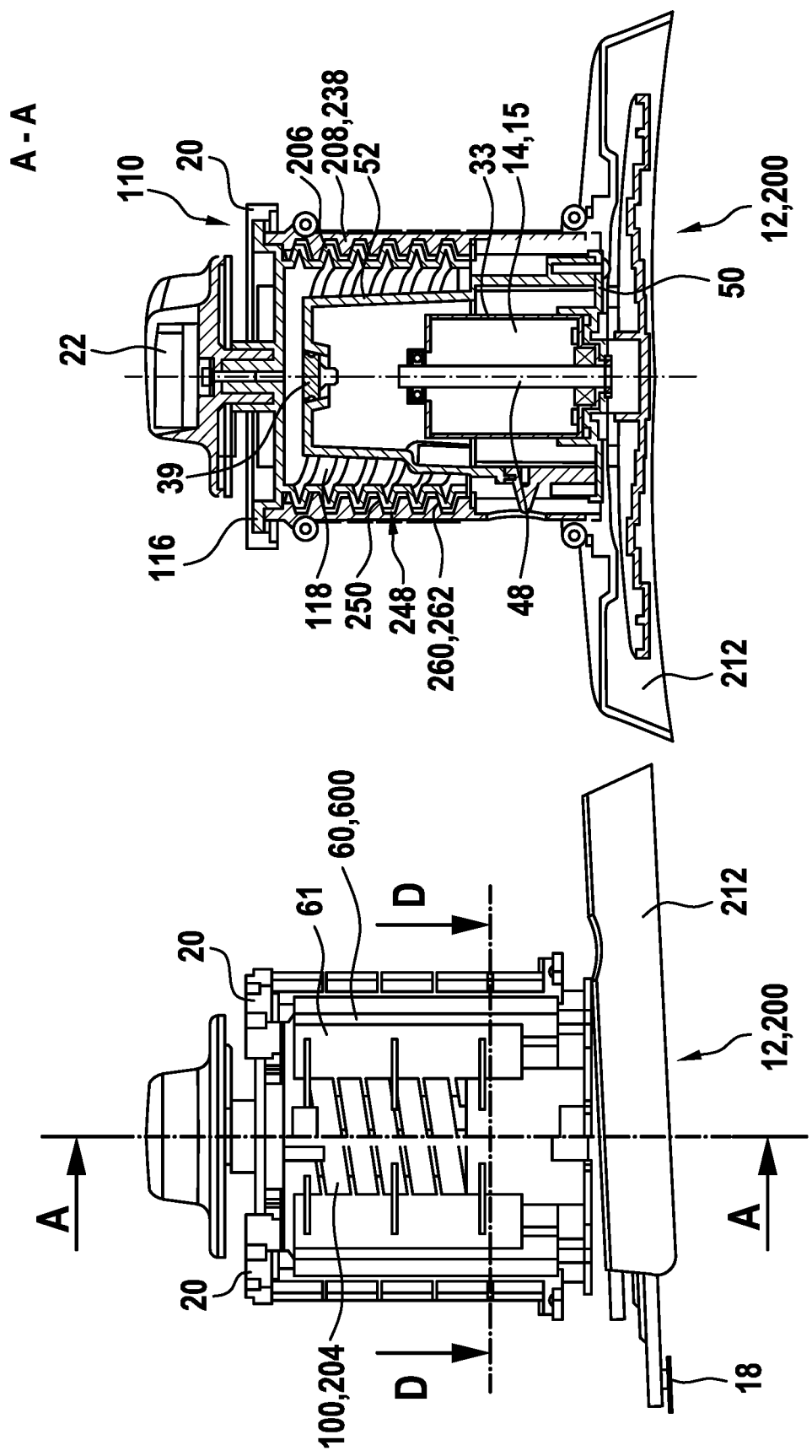
FIG. 6 shows a side view of the partial detail and a sectional illustration through the section plane A-A.

FIG. 4 and FIG. 5 show, in the section C-C and D-D respectively, the bearing and supporting elements 102 in a sectional illustration. The bearing and supporting elements 102 are of block-shaped, in particular cuboidal, form. As per FIG. 5, they are arranged at regular intervals or angles with respect to one another, in particular about the axis 59. Four bearing and supporting elements 102, which are arranged in each case at intervals of 90° with respect to one another, are visible. It is the case, so to speak, that one bearing and supporting element 102 is arranged in each quadrant. These are arranged in a plane 126. For the elastic bearing and supporting elements 102, multiple receiving devices 134, 135 are provided on the motor-receiving housing 36, which receives the drive unit 14, and on the support unit 100. The receiving devices 134 are provided as abutment surfaces 136, 138, 140, 142 radially with respect to the axis 59 and in the circumferential direction or tangentially about the axis 59. The abutment surfaces 138, 142 are, in particular in the case of receiving devices 134 which are adjacent in the circumferential direction, supported in opposite circumferential directions 25 by webs 144, 146. The bearing and supporting element(s) 102 and the receiving devices 134 for the one or more elastic bearing and supporting elements 102 of adjacent quadrants are preferably provided for supporting forces in opposite circumferential directions 25 about the height adjustment axis 590. The receiving devices 134 may be shaped so as to be optimized in terms of geometrical moment of inertia for forces in the circumferential direction 25, for example by means of webs and transverse webs which extend for example in the circumferential direction 25.

In a plane 128 parallel to the plane 126 (cf. FIG. 4), there are likewise arranged four bearing and supporting elements 102. The bearing and supporting elements 102 which are arranged in the plane 128 are arranged axially in an end region of the motor housing 33. In this region, the motor housing 33 is also received by the motor-receiving housing 36. An outer contour 130 of the motor-receiving housing 36 which receives the drive unit 14 is spaced apart from an inner contour 132 of the support unit 100 by the bearing and supporting elements 102. It is the case, so to speak, that a minimum spacing is attained between said components. This serves for preventing a direct transmission of oscillations and/or coupling. At least during the normal operation of the working appliance, an oscillation-decoupling action is realized. Thus, at least during the normal operation of the working appliance 10, the drive unit 14 and/or the tool receptacle 12 and/or the motor-receiving housing 36, which receives the drive unit 14, are/is received or borne on the support unit 100 or the sliding seat 204 exclusively via the one or more elastic bearing and supporting elements 102.

The one or more elastic bearing and supporting elements 102 and/or the drive unit 14 and/or the motor-receiving housing 36, which receives the drive unit 14, and/or the support unit 100 are formed so as to support the drive unit 14 relative to the support unit 100 in an axial direction along the height adjustment axis 590, radially with respect thereto and/or in the circumferential direction with respect thereto, preferably in opposite circumferential directions with respect thereto. The support unit 100 is constructed from two half-shells 99, 101 which, when connected, in particular when screw-connected, can compress the elastic bearing and supporting elements 102. These are thus preloaded. With increased expenditure of force, an additional displacement of the motor-receiving housing 36 relative to the support unit 100 can be performed.

It is proposed that overload protection means 148 (cf. in particular FIGS. 4 and 5), in particular positive-locking means 152, for example abutment means 154, are provided. In particular, corresponding abutment means 154, 156, 158, 160 are provided on the motor-receiving housing 36, which receives the drive unit 14, and on the support unit 100. In this way, loads which exceed a threshold value can be accommodated and/or cushioned. They are provided so as to enter into engagement when a maximum setpoint deformation of the elastic bearing and supporting elements 102 is reached. They can transmit the forces from the tool 18, the tool receptacle 12, the drive unit 14 and/or the motor-receiving housing 36 to the support unit 100 and/or the chassis 45, while at least partially bypassing the elastic bearing and supporting elements 102. They are provided for protecting against loads which exceed the normal operation of the working appliance 10. The overload protection means 148 are in particular formed as axially, radially and/or tangentially positively locking means—relative to the axis 59 or the height adjustment axis 590. For example, it is possible for one or more ribs to be provided which are formed on the motor-receiving housing 36 and on the support unit 100 in an axial-radial direction and/or transversely with respect thereto in a tangential-radial direction. The positive-locking elements, for example ribs, overlap such that a movement in the axial, radial and/or tangential direction or circumferential direction 25 is blocked by these, in the event of corresponding displacement. Furthermore, it can be seen from FIG. 5 that the motor-receiving housing 36 radially completely surrounds the drive unit 14, in particular the motor 15. The motor housing 33 is spaced apart from the motor-receiving housing 36 radially in relation to the axis 59 on all sides. Also, the motor-receiving housing 36 is designed to be radially and axially spaced apart from the support element 100 on all sides.

Figure 10:
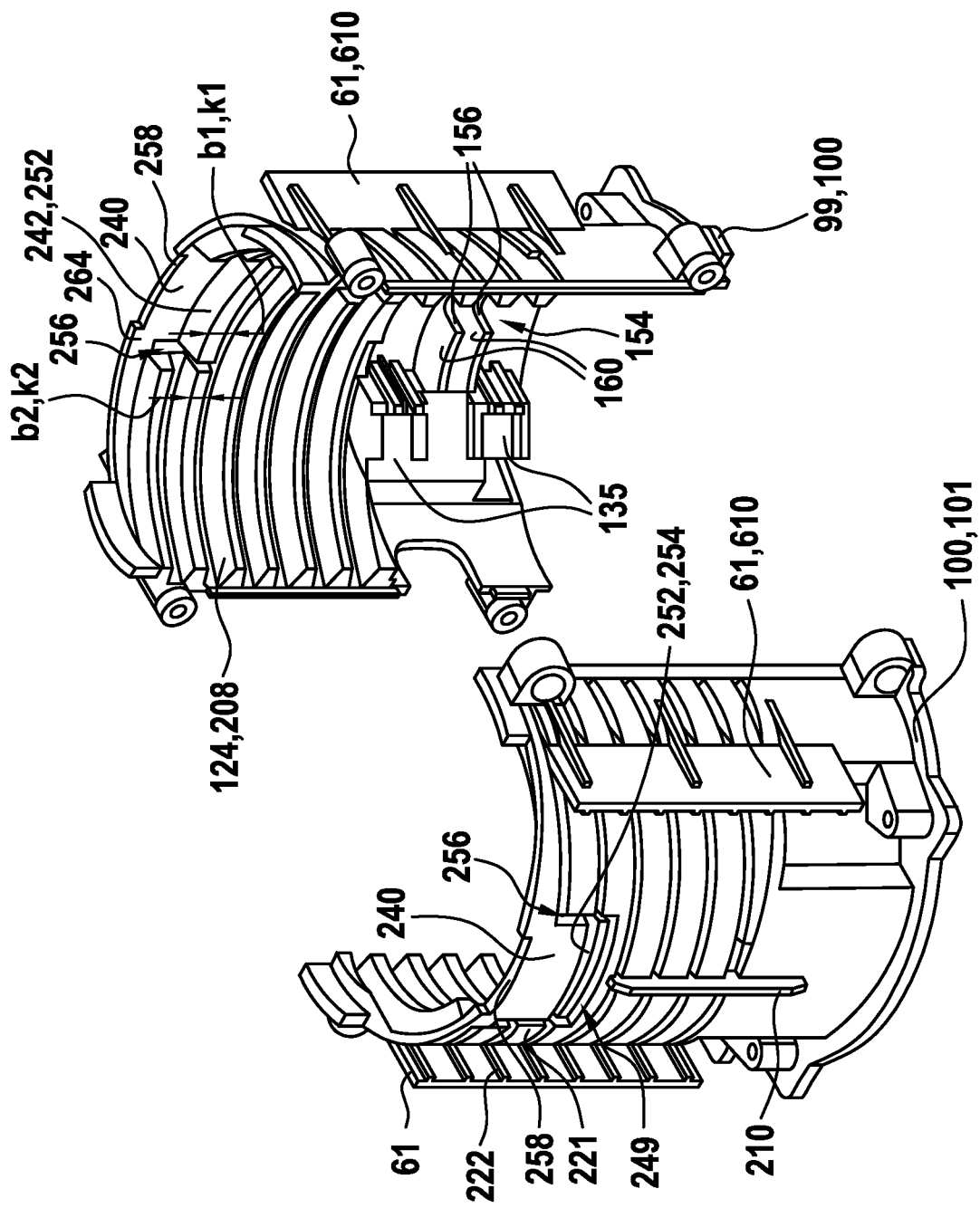
FIG. 10 is a perspective individual illustration of a support unit or of a sliding seat.

It can be seen from FIGS. 10 and 11 that the thread 208 of the sliding seat 204 or of the support unit 100 has at least two thread sections 236, 238. One thread section 236 is an elastically displaceable thread section 236, preferably a thread section 236 which is displaceable radially and/or axially elastically in relation to the thread axis and in relation to the further thread section 238. The thread axis is in this case configured to be identical to the axis 59 or the height adjustment axis 590. The thread section 236 comprises means which, in relation to the further thread section 238, increase a thread tooth width b1 of the one thread section 236 and/or reduce a thread turn width g1 of the one thread section 236 and/or cause an offset in the lead P1 of the thread sections 236, 238 relative to one another. The thread tooth width b2 of the further thread section 238 is thus smaller than the thread tooth width b1 of the one thread section 236, and/or a thread turn width g2 is greater. For elastic displaceability, the one thread section 236 is received in particular on a lug 240 which is elastically displaceable radially with respect to the thread axis. The thread 208 thus has at least one thread turn with at least two thread turn sections 236, 238, wherein the one thread turn section 236, in particular the one elastically displaceable thread turn section 236, has a different lead P1 and/or a different flank width b1, than the further thread turn section 238 or its lead P2 and/or flank width b2 (compare also, by way of example, the enlarged view of FIGS. 7 and 8). The thread 208 has at least two thread sections 236, 238 which adjoin one another in the circumferential direction 25 in relation to the helical line of the thread 208, wherein one thread flank 242, in particular one thread flank surface, preferably one thread tooth flank of the one relative to the further thread section 238, has an axial offset a1 in relation to the helical line 244 and/or thread axis and/or has an offset a1 normally with respect to the helical line. The thread tooth width b1 and/or flank width b1 and/or tip width k1 of the one thread section 236 is greater than that of the further thread section 238.

The means is in this case thus a thread flank 242 with a different lead P1 and/or a different flank width b1 and/or a different tooth tip width k1 than the further thread section 238—or the lead P2, flank width b2 and/or tooth tip width k2 thereof. The means may also be a thread flank 242, in particular a thread flank surface, preferably a thread tooth flank, which has an axial offset a1, and/or an offset normally with respect to the helical line 244 of the thread turn, relative to the further thread section 238. In this case, too, the means may be here a greater thread tooth width and/or flank width b1 and/or a smaller thread turn width g1 or thread tooth space of the one thread section 236 in relation to the thread tooth width b2 or flank width b2 or thread turn width g2 or thread tooth space of the further thread section 238. The thread flank 242 may however also be formed as sole flank and have an offset a1 relative to the further thread section 236.

In this way, an axial play (cf. in particular FIGS. 2, 7 and 8 and see in particular reference designations 246 and 248) of the threads 206, 208 with respect to one another can be at least reduced and/or unilaterally shifted. A play 246 can be curtailed in a defined manner or shifted toward an advantageous side. In the region of the one thread section 236, it is advantageously eliminated at both thread or tooth flanks 242, 243. The tooth width or flank width b1 narrows and/or fills, entirely and/or at both flank sides, the tooth space width or the flank spacing of the thread 206 or of the thread turn of the thread 206 of the rotary body 118. Nevertheless, relative rotation of the threads 206, 208 at least with reduced play remains possible. On the one hand, because the thread section 236 is received so as to be radially elastically displaceable in relation to the thread section 238 or the thread 206 of the rotary body and/or, on the other hand, because the flanks are designed to be axially elastic with respect to one another owing to the in particular axial clearance 249 (cf. FIGS. 7, 8 and 10). That is to say, the tooth flanks 242, 243 of a thread tooth are designed to be displaceable relative to one another, in particular elastically displaceable relative to one another, preferably displaceable relative to one another in a spread and preloaded manner. This may also or additionally be achieved by virtue of a material notch 254 being provided between the tooth flanks 242, 243 of the thread tooth 252. The means could also be at least one surface, in particular one sliding surface, in particular one surface which has the same action as a tooth flank and which narrows a thread turn width. For this purpose, not a complete thread tooth 252 but rather only one flank, for example the flank 242 or a body with the same action, would then be required.

It is advantageously possible for a generation of noise or a rattling of the threads relative to one another, in particular on uneven terrain and/or in the case of an imbalanced cutting device 200, to be avoided. The statement that the one thread section 236 has a different lead P1 and/or different thread tooth width b1 (or flank width) or thread turn width g1 (or thread tooth space) is not to be understood as meaning any deviations resulting from tolerances and/or wear. Rather, these deviations are selected or predefined by design. The flank widths b1 and b2 differ at identical flank diameters.

Preferably, the entire elastically displaceable thread turn section 236 has a different, in particular a different constant, lead P1 and/or flank width b1 than the further thread turn section 238. However, it could also at least partially have a different lead P1 and/or a different flank width b1 than the further thread turn section 238.

The thread sections 236, 238 are formed adjacent to one another in particular along a helical line of the thread 208 and/or along the circumferential direction 25 of the thread 208. A groove 256 is provided between the thread sections 236, 238. The groove 256 advantageously surrounds the one thread section 236 at three sides, such that the one thread section 236 is attached to a lug 240 or only at one side to the thread 208 or to the sliding seat 204 or the support unit 100. The lug is in particular fixed in the manner of a torsion beam to the sliding seat 204. The thread section 236, which is elastically radially displaceable relative to the thread axis, is attached via a section 264, which extends in the circumferential direction 25 relative to the thread axis, to the one thread 208 of the sliding seat 204. The section 264 is formed as a circumferential web and/or torsion beam. The elastically displaceable thread section 236 is received on the radially elastically displaceable lug 240, in particular on a lug 240 which is attached to the section 264 or circumferential web and/or torsion beam, in particular received on a free end 266 of the lug 240, preferably received spaced apart from the section 264, in particular received spaced apart from the section 264 by at least one lead height P1, P2. The section 264 and/or the lug 240 are/is fixed to a distal end 258 of the thread 208 of the sliding seat 204.

In this way, an elastic displacement of the one thread section 236 in a radial direction relative to the thread axis is possible. In conjunction with the notch 254, an elastic displacement of the flanks 242, 243 relative to one another is however also possible. The expression "adjacent in the circumferential direction 25" is intended in particular to mean adjacent in the circumferential direction of the same thread turn. For illustrative purposes, FIGS. 7 and 8 may for this purpose also reference another thread turn. Further thread sections 238 advantageously extend in both circumferential directions 25 proceeding from the elastically displaceable thread section 236. A helical line is to be understood in particular to mean the lead line or main lead line or tooth flank line at a constant flank diameter and/or at the tip of the thread 208. A lead P1, P2 (single-turn thread) is, in this context and for simplicity, also to be understood to mean a pitch (multi-turn thread). By means of the abovementioned features of the one thread section 236, it is advantageously possible to at least partially achieve inhibiting of the rotation of the rotary body 118 relative to the sliding seat 204.

The one thread section 236 advantageously partially takes away a play 246 between the threads 206, 208 or between internal and external thread at least in the region of the one thread section 236. By virtue of the fact that advantageously however only one flank 242, in particular thread flank or thread tooth flank, of the one thread section 236 is axially offset a1, a play 250 on one flank side of the further thread section 238 or of the further thread turns between the threads 206, 208 is thus, overall, taken away. At the axially opposite flank side 248 (cf. FIG. 7), there is a defined, in particular constant play 248, which is advantageously reduced only in the event of displacement, in particular under particular load circumstances of the one thread section 236. Said play 248 or absence of play 250 is present at the further thread sections 238, in particular also of further thread turns. By means of the one thread section 236, the corresponding threads 206, 208 are thus displaced such that at least one flank of the external and internal thread or of the sliding seat 204 and of the rotary body 118 lie against one another in a play-free manner. Advantageously, the corresponding threads 206, 208 are, owing to the flank offset a1 or the increased flank width b1, shifted such that at least one thread flank 260 of the adjoining further thread section 238 of the thread 208 and two thread flanks 242, 243 of the one thread section 236 lie against the counterpart thread 206 in a play-free manner. In principle, the above-stated features relating to the thread sections 236, 238 may also be provided on the thread 206 of the rotary body 118, in particular on the external thread.

FIG. 2 shows an autonomous lawnmower, having at least a chassis 45, a motor 15 and a cutting device 200 which can be driven by the motor 15, furthermore having a height adjustment device 16 at least for a displacement of the cutting device 200 and of the motor 15 relative to the chassis 45, at least for setting a working height h of the cutting device 200, in particular for setting a cutting height s of a cutting tool 18 of the cutting device 200. The height adjustment device 16 comprises a hollow cylindrical rotary body 118 and a sliding seat 204 which surrounds the hollow cylindrical rotary body 118, which rotary body and sliding seat have corresponding threads 206, 208, such that a rotation of the rotary body 118 about the height adjustment axis 590 causes a linear displacement of the sliding seat 204. The thread 208 of the sliding seat 204 has an at least elastically displaceable thread section 236. This is thread section 236 which is displaceable elastically radially to or from the axis of rotation (axis 59) of the rotary body 118. It is received elastically displaceably on a lug 240. The elastically displaceable thread section 236 advantageously has, in the state in which it is not connected to the rotary body 118, substantially the same core diameter as the rest of the thread 208 or the thread sections 238 which are adjacent in the circumferential direction.

The motor 15 and/or the motor-receiving housing 36 are designed to be displaceable within the rotary body 118, in particular so as to be height-adjustable and/or at least slightly displaceable radially, axially and in the circumferential direction, in order to ensure an oscillation-decoupling spacing. The sliding seat 204 is designed to be displaceable jointly with the motor 15 or motor-receiving housing 36. The sliding seat 204 is designed to be inhibited in terms of rotation, in particular inhibited in terms of rotation about a height adjustment axis 590. For this purpose, the axial guide devices 19 is provided. This also forms a rotary seat 110 for the rotary body 118. By means of positive-locking elements 112, the rotary seat 110 is elastically slightly displaceable with axially inhibiting action. By means of positive-locking elements on the guide device 19 and the sliding seat 204, in particular corresponding guide means 600, 601 or guide profiles 60, 61, the rotary body 118 is received with slight circumferentially elastic rotation-inhibiting action. The guide device 19, in particular the guide elements 20, advantageously form an additional component between chassis 45, the rotary body 118 and the sliding seat 204, in order to at least additionally receive the cutting device 200 and/or the motor 15 or the drive unit 14 on the lawnmower 11 or chassis 45 with oscillation-decoupling and/or vibration-damping action. The guide device 19 or guide elements 20 are fixedly connected to the chassis 45. They provide, in particular by way of the guide means thereof, at least parts of an, in a sense, floating bearing arrangement of the cutting device 200 and of the motor 15 or of the drive unit 14 and/or of the height adjustment device 16. The sliding seat 204 is radially inhibited in terms of rotation by the guide device 19.

The cutting device 200, the motor 15, the motor-receiving housing 36 and the sliding seat 204 are designed to be jointly axially displaceable. They are displaceable by means of the height adjustment device 16, or by rotation of the rotary body 118 which drives the sliding seat 204. The sliding seat 204 serves as a support device or support unit 100 for the drive unit 14 or the motor 15 and/or the motor-receiving housing 36 which receives the motor 15, such that at least the cutting and reaction forces of the cutting device 200 and drive forces of the drive unit 14 are transmitted via the bearing and supporting elements 102 to the sliding seat 204.

The motor 15 and/or the motor-receiving housing 36 are arranged so as to be displaceable within the rotary body 118. The rotary body 118 at least partially, substantially completely, radially surrounds the motor 15 and/or the motor-receiving housing 36. The sliding seat 204 is connected at least indirectly via the bearing and supporting elements 102 to the motor 15 or motor-receiving housing 36 and the cutting device 200, which is fixed to the drive shaft 48 of the motor 15. These are designed to be jointly displaceable. They are designed to be inhibited in terms of rotation.

The elastically displaceable thread section 236 is designed to be displaceable relative to the thread 208 of the sliding seat 204 or to further thread sections 238 of the thread 208. Furthermore, the elastically displaceable thread section 236 is designed to be displaceable relative to the thread 206 of the rotary body 118. The elastically displaceable thread section 236 is formed as a single piece with the thread 208 and/or the sliding seat 204. The elastically displaceable thread section 236 has a thread tooth width b1 which is greater, and/or a thread tooth space g1 which is smaller, than the thread tooth width b2 or thread tooth space g2, respectively, of further thread sections 238 of the thread 208 of the sliding seat 204. Two elastically displaceable thread sections 236 are provided on sides which are situated oppositely in relation to the thread axis or the height adjustment axis 590. They engage into different thread turns of the thread 206 of the rotary body 118. In particular, in this way, the threads 206, 208 do not become jammed relative to one another. The one or more elastically displaceable thread section 236 have a thread tooth width b1 which at least substantially corresponds to the thread tooth space of a thread turn of the rotary body 118. In this way, it is at least partially possible, in a thread section of the rotary body 118, for a thread play to advantageously be reduced or eliminated in the entire thread. By means of the elastic displaceability, the thread section 236 can however be displaced or forced at least radially outward, in particular in order to allow a relative rotation of rotary body 118 and sliding seat 204. Furthermore, the flanks 242 or tooth flanks of the elastically displaceable thread section 236 may also be designed to be elastically displaceable relative to one another, such that the flank width b1 or the tooth width can be elastically flexibly reduced under the action of force. At least as a result of the elastic displaceability of the one or more elastically displaceable thread sections 236 and/or elastically displaceable flanks 242, 243, a rotation of the threads 206, 208 of rotary body 118 and sliding seat 204 therefore remains possible. Also, in this way, self-locking of the threads 206, 208 of rotary body 118 and sliding seat 204 can be improved, and/or a self-locking action of the threads 206, 208, which are in the form of trapezoidal threads, can be intensified. An inadvertent height adjustment of the height adjustment device 16 can also be avoided in this way. Even in the event of wear of the threads 206, 208 on rotary body 118 and/or sliding seat 204, the elastically displaceable thread section 236 can in some cases compensate for this wear. The elastically displaceable thread section 236 could also be designed to be preloaded in a radially inward direction.

The elastically displaceable thread section 236 is arranged in the region of an end 258, which is arranged distally in relation to the motor-receiving region of the sliding seat 204, or in relation to the region where the bearing and supporting elements 102 are arranged, of the sliding seat 204, in particular in the region of a distal third of the thread 206 of the sliding seat 204. In this way, the elastically displaceable thread section 236 can remain in engagement with the rotary body 118 over the entire provided height adjustment distance. It can thus be achieved that the elastic displaceable thread section 236 is in engagement with the thread 206 of the rotary body 118 over the entire height adjustment travel. By virtue of the fact that the elastically displaceable thread section 236 is arranged on the sliding seat 204, in particular in this region, there is no need for multiple axially offset elastically displaceable thread sections 236 on the sliding seat 204. Furthermore, it can be seen in particular from the enlarged illustration in FIGS. 7 and 8 that a lower flank 260, in relation to the height adjustment axis 590, of the thread 208 of the sliding seat 204 lies against an upper flank 262 of the thread 206 of the rotary body 118. The relatively wide thread tooth 252 of the in particular elastically displaceable thread section 236 is thus arranged so as to be offset (cf. FIG. 11), in this case in particular by means of an offset a1 upward along the height adjustment axis 590, such that the thread 208 lies with a lower flank 260 of the thread 208 against the thread 206 of the rotary body 118. This is advantageous because the gravitational force of the cutting device 200 and/or of the drive unit 14 and/or of the motor-receiving housing 36 would also tend to displace the sliding seat 204 in that direction. To overcome the play, it is thus also necessary for the weight force of said components to be overcome. By means of the arrangement and/or formation of the thread tooth on the lug 240 which is of relatively rigid form in the direction of the height adjustment axis 590, an axial displacement of the elastically displaceable thread section 236 is at least impeded. A radial displacement requires less resistance. By virtue of the fact that the lug is fixed or unilaterally fastened axially, and not in the circumferential direction, to the sliding seat 204 or to the thread 208, the flexibility of said lug in the axial direction is low, or the arrangement is axially relatively rigid.

A play between rotary body 118 and sliding seat 204 can advantageously be at least avoided or eliminated. The elastically displaceable thread section 236 can be provided for damping, in particular for vibration damping. Vibrations of the cutting unit or cutting device 200 and/or of the motor 15, in particular in the transmission path to the chassis 45 and/or housing 34, can be dampened. The noise emissions of the lawnmower 11 can be reduced. A generation of noise, in particular rattling noises or the like, can be avoided. In particular, a radial or axial play between rotary body 118 and sliding seat 204 is reduced or prevented. A rotation-inhibiting action can be attained. The rotation-inhibiting action can however be overcome when an actuation is intended, such that a force that has to be imparted to perform the height adjustment remains relatively low. This is an inexpensive means for vibration prevention or noise prevention.

The sliding seat 204 is furthermore received linearly displaceably on the outer lateral surface of the rotary body 118 or on the thread 206 thereof. A motor-receiving housing 36 which in particular sealingly receives the motor 15 is connected to the sliding seat 204 such that the motor-receiving housing 36 is received within the cylindrical rotary body 118, in particular within an inner cylindrical lateral surface of the rotary body 118, in particular so as to be linearly displaceable together with the sliding seat 204. The rotary body 118 has an external thread and the sliding seat 204 has an internal thread, in particular in order to be displaceably received linearly displaceably on the outer lateral surface of the rotary body 118. In this way, a very compact design of the height adjustment device 16 and/or of the motor-receiving housing 36 and/or of the lawnmower 11 can be attained. A design which seals off the motor 15 is made possible. A vibration-damping design is made possible.

The invention claimed is:

1. An autonomous lawnmower, comprising:
   a chassis;
   a motor configured to drive a cutting device; and
   a height adjustment device configured to displace the cutting device and the motor relative to the chassis to set a working height of the cutting device relative to the chassis to set a cutting height of a cutting tool of the cutting device, wherein the height adjustment device has
      a hollow cylindrical rotary body having a first thread, and
      a sliding seat surrounding the rotary body and having a second thread,
   wherein
      the first and second threads are configured such that a rotation of the rotary body results in a linear displacement of the sliding seat,
      at least one of the first and second threads has at least two thread sections,
      a first of the at last two thread sections is elastically displaceable radially in relation to a thread axis, and is configured, in relation to a second of the at least two thread sections, at least one of increase a thread tooth width, reduce a thread turn width, and cause an offset of a flank and/or an offset of a lead of the first thread section.

2. The autonomous lawnmower according to claim 1, wherein the first of the at last two thread sections includes at least one of:
   a thread flank with a different lead and/or with a different flank width:
   a thread tooth flank which, relative to the second of the at least two thread sections has an axial and/or normal offset in relation to a helical line thereof; and
   a greater thread tooth width and/or flank width and/or tooth tip width and/or a smaller thread turn width with respect to a thread tooth width or flank width or thread turn width of the second of the at least two thread sections.

3. The autonomous lawnmower according to claim 1, wherein the first of the at last two thread sections includes:
   a thread tooth with tooth flanks which are displaceable relative to one another axially with respect to the thread axis, or normally with respect to a helical line of the thread.

4. The autonomous lawnmower according to claim 1, wherein the first of the at last two thread sections includes:
   at least one sliding surface with the same action as a tooth flank, which narrows a thread tooth width and/or causes the offset.

5. The autonomous lawnmower according to claim 1, wherein the first of the at least two thread sections is attached to the at least one of the first and second threads, or to the rotary body, or to the sliding seat by way of a section which extends in a circumferential direction with respect to the thread axis.

6. The autonomous lawnmower according to claim 5, wherein the section is formed as at least one of a circumferential web and torsion beam.

7. The autonomous lawnmower according to claim 5, wherein the first of the at least two thread sections is received on a free end of a radially elastically displaceable lug which is attached to the section and spaced apart from the section by at least one lead height.

8. The autonomous lawnmower according to claim 7, wherein at least one of the section and the lug is fixed to a distal end of the at least one of the first and second threads.

9. The autonomous lawnmower according to claim 1, wherein:
the at least two thread sections are spaced apart equiangularly about the thread axis;
the second of the at last two thread sections is elastically displaceable;
the first and second elastically displaceable thread sections lie in a plane normal to the thread axis; and
the first and second elastically displaceable thread sections are arranged on different thread turns of the at least one of the first and second threads which is formed as a multi-turn thread.

10. The autonomous lawnmower according to claim 7, wherein the first of the at least two thread sections is formed as a single piece with at least one of the rotary body, the sliding seat, the lug, and the second of the at least two thread sections.

11. The autonomous lawnmower according to claim 1, further comprising:
a motor-receiving housing in which the motor is received with sealing action, the motor-receiving housing connected to the sliding seat such that the motor-receiving housing is received within an inner cylindrical lateral surface of the rotary body and configured to be linearly displaceable together with the sliding seat relative to one of the rotary body and the chassis.

12. The autonomous lawnmower according to claim 1, further comprising:
at least one elastic bearing and supporting element supporting and bearing the motor relative to the sliding seat with oscillation-decoupling action, the at least one elastic bearing and supporting element positioned between the sliding seat and a motor-receiving housing which receives the motor.

13. The autonomous lawnmower according to claim 11, the motor-receiving housing comprising:
a cover; and
a main body in the form of a pot-shaped housing, wherein
the cover fixes the motor on the motor-receiving housing,
the cover and the main body are formed from materials with different thermal conductivity,
the cover is formed from a material with a thermal conductivity which is several times higher than the thermal conductivity of the main body, and
the main body is formed from a thermally insulating plastic.

14. The autonomous lawnmower according to claim 1, further comprising:
at least one guide configured to provide rotation-inhibiting and axial guidance of the sliding seat relative to the chassis about or in a height adjustment axis direction, the at least one guide positioned between the chassis and the sliding seat and at least one of (i) holding and bearing the motor, and (ii) holding and bearing a motor-receiving housing which receives the motor, wherein
the at least one guide is configured to be elastically displaceable in a circumferential direction about the height adjustment axis, and
the at least one guide is part of at least one of a guide device and at least one guide element.

* * * * *